US010698924B2

(12) United States Patent
Rais-Ghasem et al.

(10) Patent No.: US 10,698,924 B2
(45) Date of Patent: Jun. 30, 2020

(54) GENERATING PARTITIONED HIERARCHICAL GROUPS BASED ON DATA SETS FOR BUSINESS INTELLIGENCE DATA MODELS

(71) Applicant: International Business Machines Corporation, Armonk, NY (US)

(72) Inventors: Mohsen M. Rais-Ghasem, Ottawa (CA); Ralf Vierich, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 1001 days.

(21) Appl. No.: 14/285,269

(22) Filed: May 22, 2014

(65) Prior Publication Data

US 2015/0339369 A1    Nov. 26, 2015

(51) Int. Cl.
*G06F 16/00*     (2019.01)
*G06F 16/28*     (2019.01)
(Continued)

(52) U.S. Cl.
CPC .......... *G06F 16/282* (2019.01); *G06F 16/367* (2019.01); *G06F 40/284* (2020.01)

(58) Field of Classification Search
CPC .......... G06F 16/22; G06F 16/24; G06F 16/31; G06F 16/35; G06F 16/36; G06F 16/84;
(Continued)

(56) References Cited

U.S. PATENT DOCUMENTS 5,504,879 A * 4/1996 Eisenberg ................. G06F 8/71
                                                         707/999.1
5,550,964 A     8/1996 Davoust
(Continued)

FOREIGN PATENT DOCUMENTS

CN      101196900 A      6/2008
CN      101286151 A     10/2008
(Continued)

OTHER PUBLICATIONS

Fei Li et al., "Constructing an Interactive Natural Language Interface for Relational Databases," Proceedings of the VLDB Endowment, vol. 8, No. 1, Sep. 1, 2014, 12 pp.
(Continued)

*Primary Examiner* — Belix M Ortiz Ditren
*Assistant Examiner* — Rezwanul Mahmood
(74) *Attorney, Agent, or Firm* — Francis Lammes; Stephen J. Walder, Jr.; Nicole Spence

(57) ABSTRACT

Techniques are described for generating a hierarchical group based on a set of data. In one example, a method includes classifying two or more data items from a set of data with respect to a library of ontological concepts. The method further includes classifying the two or more data items with respect to lexical correlations between the two or more data items. The method further includes generating a hierarchical group in which the two or more data items are partitioned into one or more hierarchical partitions based at least in part on the classifying with respect to the library of ontological concepts and the classifying with respect to the lexical correlations, wherein each of the one or more hierarchical partitions comprises the two or more data items.

20 Claims, 9 Drawing Sheets

(51) Int. Cl.
*G06F 16/36* (2019.01)
*G06F 40/284* (2020.01)

(58) Field of Classification Search
CPC ...... G06F 16/93; G06F 16/245; G06F 16/282; G06F 16/284; G06F 16/285; G06F 16/288; G06F 16/322; G06F 16/367; G06F 16/2228; G06F 16/9024
See application file for complete search history.

(56) References Cited

U.S. PATENT DOCUMENTS

| | | | | |
|---|---|---|---|---|
| 5,659,723 | A * | 8/1997 | Dimitrios | G06F 8/24 707/999.103 |
| 5,842,213 | A | 11/1998 | Odom et al. | |
| 6,035,300 | A * | 3/2000 | Cason | G06F 16/288 707/999.104 |
| 6,052,656 | A | 4/2000 | Suda et al. | |
| 6,061,675 | A * | 5/2000 | Wical | G06F 40/253 706/45 |
| 6,101,515 | A * | 8/2000 | Wical | G06F 16/353 715/234 |
| 6,108,004 | A | 8/2000 | Medl | |
| 6,199,034 | B1 | 3/2001 | Wical | |
| 6,289,500 | B1 | 9/2001 | Baxter et al. | |
| 6,424,973 | B1 | 7/2002 | Baclawski | |
| 6,675,159 | B1 * | 1/2004 | Lin | G06F 40/253 707/999.003 |
| 7,493,253 | B1 * | 2/2009 | Ceusters | G06F 40/30 704/9 |
| 7,499,944 | B2 | 3/2009 | Higuchi | |
| 7,502,779 | B2 | 3/2009 | Brockway et al. | |
| 7,562,074 | B2 | 7/2009 | Liddell et al. | |
| 7,734,659 | B2 | 6/2010 | Lori | |
| 7,739,104 | B2 | 6/2010 | Berkan et al. | |
| 7,774,288 | B2 | 8/2010 | Acharya et al. | |
| 7,877,421 | B2 * | 1/2011 | Berger | G06F 16/288 707/809 |
| 7,899,810 | B2 | 3/2011 | Cambot et al. | |
| 7,930,293 | B2 * | 4/2011 | Fox | G06F 16/288 707/713 |
| 7,958,165 | B1 * | 6/2011 | Devanathan | G06F 16/288 707/810 |
| 8,019,758 | B2 | 9/2011 | Zheng et al. | |
| 8,099,382 | B2 | 1/2012 | Liu et al. | |
| 8,150,832 | B2 | 4/2012 | Helfman | |
| 8,175,911 | B2 | 5/2012 | Cao et al. | |
| 8,239,342 | B2 | 8/2012 | Ross et al. | |
| 8,266,148 | B2 | 9/2012 | Guha et al. | |
| 8,332,440 | B2 | 12/2012 | Parker, III et al. | |
| 8,452,804 | B2 | 5/2013 | Bakalash et al. | |
| 8,550,964 | B2 | 10/2013 | Ish, III et al. | |
| 8,606,691 | B1 * | 12/2013 | Angermeier | G06Q 40/06 705/1.1 |
| 8,645,362 | B1 | 2/2014 | Jain et al. | |
| 8,849,843 | B1 | 9/2014 | George et al. | |
| 8,856,156 | B1 * | 10/2014 | McNair | G06N 5/02 707/756 |
| 8,977,953 | B1 | 3/2015 | Pierre et al. | |
| 8,996,555 | B2 | 3/2015 | Kuchmann-Beauger et al. | |
| 9,064,006 | B2 | 6/2015 | Hakkani-Tur et al. | |
| 9,158,847 | B1 * | 10/2015 | Majumdar | G06F 16/951 |
| 9,734,146 | B1 * | 8/2017 | McNair | G06N 5/02 |
| 9,984,116 | B2 * | 5/2018 | Rais Ghasem | G06F 16/243 |
| 10,157,195 | B1 * | 12/2018 | Panwar | G06F 9/54 |
| 2002/0016800 | A1 | 2/2002 | Spivak et al. | |
| 2003/0028541 | A1 | 2/2003 | Bradley et al. | |
| 2003/0074352 | A1 * | 4/2003 | Raboczi | G06F 16/2471 707/999.004 |
| 2003/0074353 | A1 * | 4/2003 | Berkan | G06F 16/3344 707/999.003 |
| 2003/0088543 | A1 | 5/2003 | Skeen et al. | |
| 2003/0120665 | A1 * | 6/2003 | Fox | G06F 16/288 707/999.1 |
| 2003/0126147 | A1 | 7/2003 | Essafi et al. | |
| 2003/0163597 | A1 * | 8/2003 | Hellman | G06F 16/84 719/316 |
| 2003/0221171 | A1 | 11/2003 | Rust et al. | |
| 2004/0024739 | A1 | 2/2004 | Copperman et al. | |
| 2004/0260675 | A1 * | 12/2004 | Bruno | G06F 16/2264 707/999.002 |
| 2005/0034107 | A1 * | 2/2005 | Kendall | G06N 5/027 717/136 |
| 2005/0043940 | A1 | 2/2005 | Elder | |
| 2005/0278321 | A1 | 12/2005 | Vailaya et al. | |
| 2006/0024654 | A1 | 2/2006 | Goodkovsky | |
| 2006/0074980 | A1 | 4/2006 | Sarkar | |
| 2006/0106824 | A1 | 5/2006 | Stuhec | |
| 2006/0117002 | A1 | 6/2006 | Bolesh et al. | |
| 2006/0179074 | A1 | 8/2006 | Martin et al. | |
| 2006/0271909 | A1 * | 11/2006 | Huang | G06F 8/71 717/105 |
| 2006/0288038 | A1 | 12/2006 | Zheng et al. | |
| 2007/0078889 | A1 | 4/2007 | Hoskinson et al. | |
| 2007/0088723 | A1 | 4/2007 | Fish | |
| 2007/0094060 | A1 | 4/2007 | Apps et al. | |
| 2007/0118551 | A1 | 5/2007 | Akkiraju et al. | |
| 2007/0156712 | A1 * | 7/2007 | Wasserman | G06F 16/284 707/999.1 |
| 2007/0174188 | A1 | 7/2007 | Fish | |
| 2007/0174270 | A1 * | 7/2007 | Goodwin | G06F 16/35 707/999.005 |
| 2007/0271291 | A1 * | 11/2007 | Acharya | G06K 9/6219 707/999.102 |
| 2008/0016039 | A1 | 1/2008 | Brown et al. | |
| 2008/0168135 | A1 | 1/2008 | Redlich et al. | |
| 2008/0059498 | A1 | 3/2008 | Carus et al. | |
| 2008/0097979 | A1 | 4/2008 | Heidloff et al. | |
| 2008/0189312 | A1 | 8/2008 | Taranov et al. | |
| 2008/0195604 | A1 | 8/2008 | Sears | |
| 2008/0262945 | A1 * | 10/2008 | Clark | G06Q 30/06 705/26.62 |
| 2008/0270380 | A1 | 10/2008 | Ohrn et al. | |
| 2008/0301168 | A1 * | 12/2008 | Adler | G06F 16/86 707/999.102 |
| 2009/0125463 | A1 | 5/2009 | Hido | |
| 2009/0172035 | A1 * | 7/2009 | Lessing | G06F 16/284 707/999.107 |
| 2009/0222476 | A1 | 9/2009 | Williamson | |
| 2009/0254847 | A1 | 10/2009 | Counts et al. | |
| 2009/0265297 | A1 | 10/2009 | Misra et al. | |
| 2009/0319544 | A1 | 12/2009 | Griffin et al. | |
| 2009/0327240 | A1 | 12/2009 | Meehan et al. | |
| 2010/0017395 | A1 * | 1/2010 | Wayn | G06F 16/283 707/E17.014 |
| 2010/0036829 | A1 | 2/2010 | Leyba | |
| 2010/0049692 | A1 | 2/2010 | Astito et al. | |
| 2010/0082691 | A1 | 4/2010 | Jaster et al. | |
| 2010/0199223 | A1 | 8/2010 | Colner | |
| 2010/0202698 | A1 | 8/2010 | Schmidtler et al. | |
| 2010/0287014 | A1 | 11/2010 | Gaulin et al. | |
| 2010/0049766 | A1 | 12/2010 | Sweeney et al. | |
| 2010/0325206 | A1 | 12/2010 | Dayal et al. | |
| 2011/0040552 | A1 * | 2/2011 | Van Guilder | G06F 40/40 704/4 |
| 2011/0072021 | A1 | 3/2011 | Lu et al. | |
| 2011/0087629 | A1 | 4/2011 | B'Far et al. | |
| 2011/0093469 | A1 | 4/2011 | B'Far et al. | |
| 2011/0138312 | A1 | 6/2011 | Yeh et al. | |
| 2011/0153611 | A1 | 6/2011 | Ankisettipalli et al. | |
| 2011/0246409 | A1 * | 10/2011 | Mitra | G06F 17/18 706/52 |
| 2011/0258202 | A1 | 10/2011 | Mukherjee et al. | |
| 2011/0307485 | A1 | 12/2011 | Udupa et al. | |
| 2011/0320396 | A1 * | 12/2011 | Hunt | G06F 16/84 706/47 |
| 2012/0053986 | A1 * | 3/2012 | Cardno | G06Q 30/0201 705/7.29 |
| 2012/0078926 | A1 | 3/2012 | Chu-Carroll et al. | |
| 2012/0089636 | A1 | 4/2012 | Qayyum et al. | |
| 2012/0102032 | A1 | 4/2012 | Bryne et al. | |

(56) References Cited

U.S. PATENT DOCUMENTS

| | | | |
|---|---|---|---|
| 2012/0124080 A1* | 5/2012 | Willard | G06F 16/2438 707/769 |
| 2012/0143780 A1 | 6/2012 | Adendorff et al. | |
| 2012/0150823 A1* | 6/2012 | Tofano | G06F 16/2272 707/692 |
| 2012/0154402 A1 | 6/2012 | Mital et al. | |
| 2012/0166372 A1* | 6/2012 | Ilyas | G06N 5/02 706/14 |
| 2012/0179710 A1 | 7/2012 | Hanai | |
| 2012/0197936 A1 | 8/2012 | Fuchs | |
| 2012/0233188 A1* | 9/2012 | Majumdar | G06F 16/367 707/756 |
| 2012/0290561 A1 | 11/2012 | Kobayashi et al. | |
| 2012/0310628 A1 | 12/2012 | Rathod et al. | |
| 2012/0316962 A1* | 12/2012 | Rathod | G06Q 10/107 705/14.54 |
| 2013/0060794 A1* | 3/2013 | Puttabasappa | G06F 16/182 707/755 |
| 2013/0066823 A1* | 3/2013 | Sweeney | G06N 5/02 706/50 |
| 2013/0103677 A1 | 4/2013 | Chakra et al. | |
| 2013/0116965 A1* | 5/2013 | Lin | G06F 15/00 702/150 |
| 2013/0117253 A1 | 5/2013 | Wang et al. | |
| 2013/0132365 A1* | 5/2013 | Chang | G06Q 30/0241 707/710 |
| 2013/0173507 A1 | 7/2013 | Chmiel et al. | |
| 2013/0191461 A1 | 7/2013 | Batra | |
| 2013/0205190 A1 | 8/2013 | Kossmann et al. | |
| 2013/0246430 A1 | 9/2013 | Szucs et al. | |
| 2013/0268554 A1 | 10/2013 | Kokubu et al. | |
| 2013/0300743 A1 | 11/2013 | Degrell et al. | |
| 2014/0075004 A1* | 3/2014 | Van Dusen | G06Q 30/0201 709/223 |
| 2014/0095145 A1 | 4/2014 | Assulin et al. | |
| 2014/0114902 A1 | 4/2014 | McClung et al. | |
| 2014/0164362 A1 | 6/2014 | Syed et al. | |
| 2014/0164379 A1 | 6/2014 | Jojgov et al. | |
| 2014/0172417 A1* | 6/2014 | Monk, II | G06F 40/30 704/9 |
| 2014/0195473 A1* | 7/2014 | Citeau | G06N 5/022 706/47 |
| 2014/0195664 A1* | 7/2014 | Rahnama | H04W 4/70 709/223 |
| 2014/0207776 A1* | 7/2014 | Harris | G06Q 10/10 707/737 |
| 2014/0244429 A1 | 8/2014 | Clayton et al. | |
| 2014/0278364 A1* | 9/2014 | Grosset | G06F 40/30 704/9 |
| 2014/0279677 A1 | 9/2014 | Grosset et al. | |
| 2014/0324750 A1* | 10/2014 | Christophe | G06N 5/022 706/46 |
| 2014/0379755 A1 | 12/2014 | Kuriakose et al. | |
| 2015/0006160 A1 | 1/2015 | Grosset et al. | |
| 2015/0006432 A1 | 1/2015 | Grosset et al. | |
| 2015/0026153 A1 | 1/2015 | Gupta et al. | |
| 2015/0032707 A1* | 1/2015 | Barykin | G06F 17/30303 707/694 |
| 2015/0066945 A1 | 3/2015 | Crowe | |
| 2015/0081711 A1* | 3/2015 | Harris | G06F 16/24522 707/737 |
| 2015/0160988 A1* | 6/2015 | Scomparim | G06F 7/00 719/318 |
| 2015/0186776 A1 | 7/2015 | Petitclerc et al. | |
| 2015/0186808 A1 | 7/2015 | Petitclerc et al. | |
| 2015/0278198 A1 | 10/2015 | Andreev | |
| 2015/0317374 A1 | 11/2015 | Petitclerc et al. | |
| 2015/0317573 A1 | 11/2015 | Petitclerc et al. | |
| 2015/0339369 A1* | 11/2015 | Rais-Ghasem | G06F 16/367 707/739 |
| 2016/0085743 A1* | 3/2016 | Haley | G06F 40/40 704/9 |
| 2016/0154840 A1* | 6/2016 | Cazemier | G06F 16/215 707/692 |
| 2016/0224653 A1 | 8/2016 | Rais-Ghasem et al. | |
| 2016/0224656 A1 | 8/2016 | Rais-Ghasem et al. | |
| 2017/0060868 A1* | 3/2017 | Rais Ghasem | G06F 16/24522 |

FOREIGN PATENT DOCUMENTS

| | | |
|---|---|---|
| EP | 2073131 A1 | 6/2009 |
| WO | 0046701 A1 | 8/2000 |
| WO | 2007005378 A2 | 1/2007 |
| WO | 2008100849 A2 | 8/2008 |
| WO | 2009094290 A2 | 7/2009 |
| WO | 2012085518 A1 | 6/2012 |

OTHER PUBLICATIONS

Rukshan Alexander et al., "Natural Language Web Interface for Database (NLWIDB)," Proceedings of the Third International Symposium, SEUSL: Jul. 6-7, 2013, 8 pp.

U.S. Appl. No. 14/610,812, filed Jan. 30, 2015 by Mohsen Rais-Ghasem et al.

U.S. Appl. No. 15/055,382, filed Feb. 26, 2016 by Mohsen Rais-Ghasem et al.

Preliminary Amendment from U.S. Appl. No. 14/610,812, filed Feb. 19, 2016 5 pgs.

"List of IBM Applications treated as related," Appendix P, 2 pgs.

"Automated Ontological Mapping for Metadata", IP.com Disclosure No. IPCOM000191276D, Dec. 24, 2009, 2 pp.

"Method and System for Dynamically Creating Business Intelligence Reports and Dashboards based on User Inputs", ip.com, ip.com No. IPCOM000202424D, Dec. 15, 2010, 6 pp.

"Method for Determining Explanatory Factors for a Selection of Aggregated Data." IP.com, Disclosure No. IPCOM000225183D, Jan. 29, 2013, 6 pp.

"Method and System for Automatically Determining Hierarchies/ Relationships from a Data Set for Generating Data Model," IP.com, Disclosure No. IPCOM000202401, Dec. 15, 2010, 5 pp.

Cao et al., "Ontology-based Integration of Business Intelligence," Web Intelligence and Agent Systems, Retrieved from internet http://www-staff.it.uts.edu.au/~lbcao/publication/W639.pdf, Dec. 6, 2006, 13 pp.

Cheng, H. et al. "An Ontology-Based Business Intelligence Application in a Financial Knowledge Management System", Expert Systems with Applications, Elsevier Ltd., 2008, doi:1 0.10616/j.eswa.2008.02.047, 9 pp.

Egozi et al., "Concept-Based Information Retrieval using Explicit Semantic Analysis," ACM Transactions on Information Systems, vol. 29, No. 2, Article 8, Apr. 2000, 38 pp.

Hofmann, "Latent Semantic Models for Collaborative Filtering," ACM Transactions on Information Systems, vol. 22, No. 1, Jan. 2004, 27 pp.

Kishore et al., "Probabilistic Semantic Web Mining Using Artificial Neural Analysis," International Journal of Computer Science and Information Security, vol. 7, No. 3, Mar. 2010, 11 pp.

Mustapha et al. "Knowledge Harvesting for Business Intelligence", Second European Business Intelligence Summer School (eBISS 2012), Jul. 15-21, 2012, Brussels, Belgium, 144 pp.

Neumayr et al. "Semantic Cockpit: An Ontology-driven, Interactive BI Tool for Comparative Data Analysis", The 1st International Workshop on Modeling and Reasoning for Business Intelligence (MoRe-BI 2011), Brussels, Belgium, Oct. 31, 2011, 20 pp.

Rais-Ghasem et al. "Towards Semantic Data Analysis" GASCON 2013, Nov. 18-20, 2013, IBM Canada Ltd., 2013, 12 pp.

Rais-Ghasem et al. "Towards Semantic Data Analysis" IBM Canada Ltd., Nov. 18, 2013, 8 pp.

Saggion et al. "Ontology-based Information Extraction for Business Intelligence" Proceedings of the 6th International Semantic Web Conference ISWC/ASWC2007, vol. 4825 of LNCS, Springer Verlag, Nov. 2007, 14 pp.

Sell et al. "SBI: A Semantic Framework to Support Business Intelligence", OBI'08, ACM, Oct. 2008, 11 pp.

(56) References Cited

OTHER PUBLICATIONS

Van Ham et al., "Guiding Multidimensional Analysis Using Decision Trees," IBM Canada Ltd., Proceedings of the 2013 Conference of the Center for Advanced Studies on Collaborative Research, Nov. 18, 2013, 15 pp.

Zarandi, "A Retail Ontology: Formal Semantics and Efficient Implementation", Thesis, University of Toronto, 2007, 180 pp.

U.S. Appl. No. 13/844,587, filed Mar. 15, 2013 entitled "Business Intelligence Data Models With Concept Identification Using Language-Specific Clues".

U.S. Appl. No. 13/844,612, filed Mar. 15, 2013 entitled "Ontology-Driven Construction of Semantic Business Intelligence Models".

U.S. Appl. No. 14/266,497, filed Apr. 30, 2014 entitled "User-Relevant Statistical Analytics Using Business Intelligence Semantic Modeling."

U.S. Appl. No. 14/141,950 filed Dec. 27, 2013 entitled Contextual Data Analysis Using Domain Information.

"List of IBM Patents or Patent Applications Treated as Related," Appendix P, dated Oct. 5, 2015, 2 pp.

"The Chado Approach," Chapter 1. Introduction, retrieved from http://papio.biology.duke.edu/babase_chado_html/the-chado-approach.html on Jan. 8, 2015, 1 pp.

Han et al., "RDF123: a mechanism to transform spreadsheets to RDF," UMBC ebiquity, Aug. 26, 2007, 19 pp.

Syed et al., "Exploiting a Web of Semantic Data for Interpreting Tables," UMBC ebiquity, Second Web Science Conference, Apr. 26-27, 2010, 8 pp.

U.S. Appl. No. 14/309,408, filed Jun. 19, 2014 entitled "Contextual Data Analysis Using Domain Information."

Fileto et al., "Baquara: A Holistic Ontological Framework for Movement Analysis using Linked Data," adfa, 2011. Springer-Verlag Berlin Heidelberg 2011, pp. 1-14.

U.S. Appl. No. 14/839,701, by Mohsen Rais Ghasem et al., filed Aug. 28, 2015.

\* cited by examiner

GENERATING PARTITIONED HIERARCHICAL GROUPS BASED ON DATA SETS FOR BUSINESS INTELLIGENCE DATA MODELS

TECHNICAL FIELD

This disclosure relates to data storage models, and more particularly, to hierarchical enterprise data storage models in business intelligence (BI) systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems, and other enterprise software systems.

Many enterprise performance management and business planning applications require a large base of users to enter data that the software then accumulates into higher level areas of responsibility in the organization. Moreover, once data has been entered, it must be retrieved to be utilized. The system may perform mathematical calculations on the data, combining data submitted by many users. Using the results of these calculations, the system may generate reports for review by higher management. Often, these complex systems make use of multidimensional data sources that organize and manipulate the tremendous volume of data using data structures referred to as data cubes. Each data cube, for example, includes a plurality of hierarchical dimensions having levels and members for storing the multidimensional data.

Business intelligence (BI) systems may be used to provide insights into such collections of enterprise data. Many enterprise data storage models include hierarchies of categories of data. These may include hierarchies of time-based data (e.g., year, quarter, month), hierarchies of geography-based data (e.g., country, state/province, city), and/or hierarchies of product-based data (e.g., product type, product line, product item). Such hierarchical data in the data storage may be incorporated as dimensional hierarchies in data analysis models, such as Online Analytical Processing (OLAP), in a BI system.

SUMMARY

In general, examples disclosed herein are directed to tools, systems, and techniques for classifying hierarchical relationships in data set from a data storage model and generating hierarchical groups based on the hierarchical relationships in the data set. A hierarchical data partitioning tool of this disclosure may classify two or more data items from a set of data with respect to a combination of lexical correlations and a library of ontological concepts to detect hierarchical relationships in a data set and to generate a hierarchical group based on the hierarchical relationships in the data set. A hierarchical data partitioning tool of this disclosure may provide hierarchical groups it generates in a user interface for use and potentially for manual editing in a data analysis application, such as an OLAP application, in a BI system.

In one example, a method for generating a hierarchical group based on a set of data includes classifying two or more data items from a set of data with respect to a library of ontological concepts. The method further includes classifying the two or more data items with respect to lexical correlations between the two or more data items. The method further includes generating a hierarchical group in which the two or more data items are partitioned into one or more hierarchical partitions based at least in part on the classifying with respect to the library of ontological concepts and the classifying with respect to the lexical correlations, wherein each of the one or more hierarchical partitions comprises the two or more data items.

In another example, a computer system for generating a hierarchical group based on a set of data includes one or more processors, one or more computer-readable memories, and one or more computer-readable, tangible storage devices. The computer system further includes program instructions, stored on at least one of the one or more storage devices for execution by at least one of the one or more processors via at least one of the one or more memories, to classify two or more data items from a set of data with respect to a library of ontological concepts. The computer system further includes program instructions, stored on at least one of the one or more storage devices for execution by at least one of the one or more processors via at least one of the one or more memories, to classify the two or more data items with respect to lexical correlations between the two or more data items. The computer system further includes program instructions, stored on at least one of the one or more storage devices for execution by at least one of the one or more processors via at least one of the one or more memories, to generate a hierarchical group in which the two or more data items are partitioned into one or more hierarchical partitions based at least in part on the classifying with respect to the library of ontological concepts and the classifying with respect to the lexical correlations, wherein each of the one or more hierarchical partitions comprises the two or more data items.

In another example, a computer program product for generating a hierarchical group based on a set of data includes a computer-readable storage medium having program code embodied therewith. The program code is executable by a computing device to classify two or more data items from a set of data with respect to a library of ontological concepts. The program code is further executable by a computing device to classify the two or more data items with respect to lexical correlations between the two or more data items. The program code is further executable by a computing device to generate a hierarchical group in which the two or more data items are partitioned into one or more hierarchical partitions based at least in part on the classifying with respect to the library of ontological concepts and the classifying with respect to the lexical correlations, wherein each of the one or more hierarchical partitions comprises the two or more data items.

The details of one or more embodiments of the disclosure are set forth in the accompanying drawings and the description below. Other features, objects, and advantages will be apparent from the description and drawings, and from the claims.

DETAILED DESCRIPTION

Various examples are disclosed herein for generating a hierarchical group based on a set of data, such as to model information with inherently hierarchical relationships from a data source. In various examples, a hierarchical data partitioning tool of this disclosure may classify two or more data items from a set of data with respect to lexical correlations, a library of ontological concepts, and potentially additional analytical factors, and generate a hierarchical group based on hierarchical relationships it detects by classifying the data. Each data partition in a generated hierarchy of data partitions may include multiple data items arranged in hierarchical levels. The hierarchical data partitioning tool may further measure correlations between the data in the hierarchical group to verify sampling of the data. A hierarchical data partitioning tool of this disclosure may automatically perform a substantial portion of the work that may otherwise have required manual effort by a data modeling expert.

A hierarchical data partitioning tool of this disclosure may provide the generated hierarchical group in a user interface for a data analysis application, such as an OLAP application. The hierarchical data partitioning tool may provide the generated hierarchical group as an initial or default hierarchical group and enable user inputs to modify the hierarchical group to create a manually curated hierarchical group starting from the default hierarchical group generated by the hierarchical data partitioning tool. A BI data analysis application of this disclosure may thereby potentially enable further revisions by a data modeling expert to a data model automatically generated by a hierarchical data partitioning tool of this disclosure. Various examples are further described below with reference to the figures.

Figure 1:
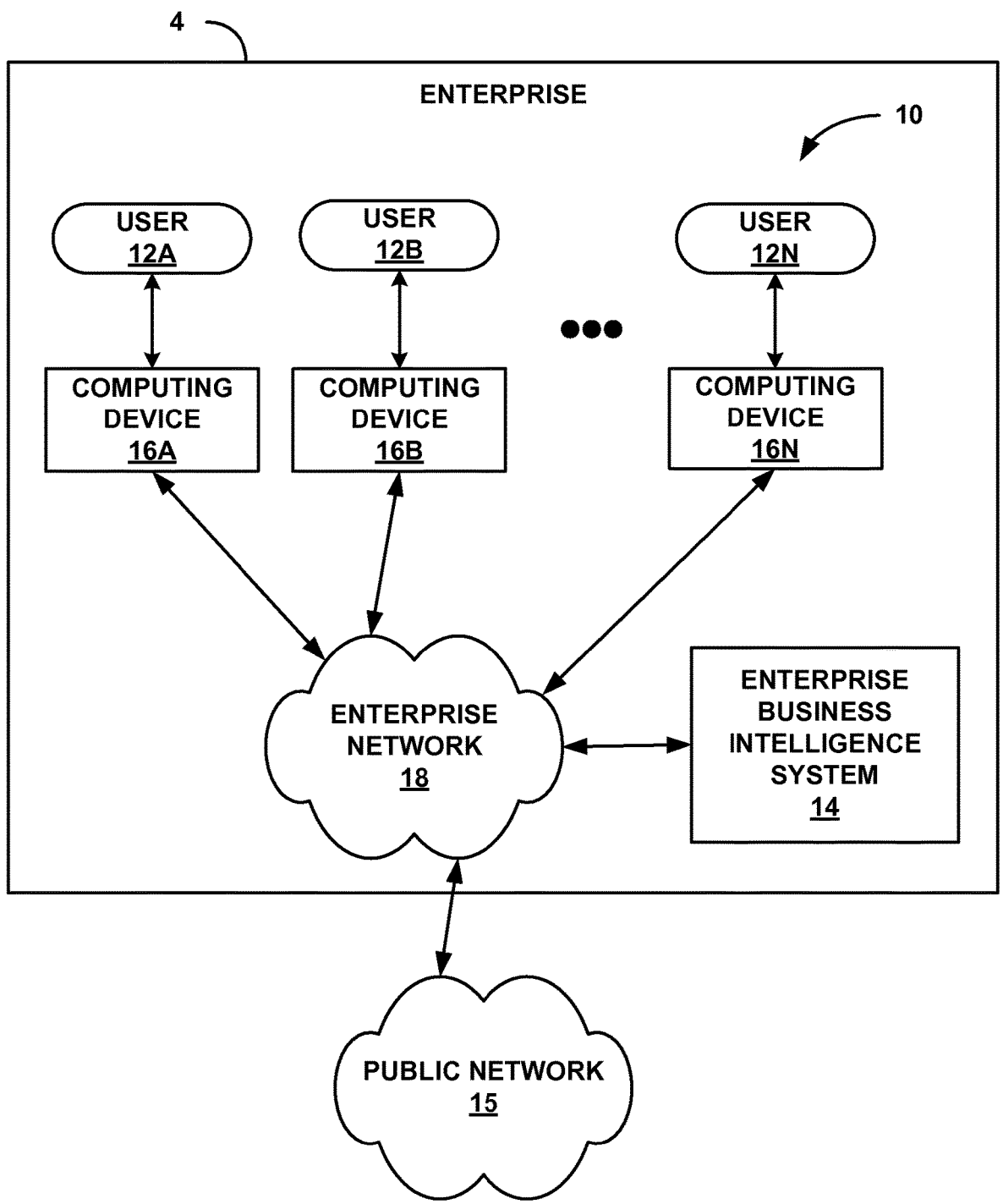
FIG. 1 is a block diagram illustrating an example enterprise having a computing environment in which users interact with an enterprise business intelligence system and data sources accessible over a public network.

FIG. 1 illustrates an example context in which a system of this disclosure may be used. FIG. 1 is a block diagram illustrating an example enterprise 4 having a computing environment 10 in which a plurality of users 12A-12N (collectively, "users 12") may interact with an enterprise business intelligence (BI) system 14. In the system shown in FIG. 1, enterprise business intelligence system 14 is communicatively coupled to a number of client computing devices 16A-16N (collectively, "client computing devices 16" or "computing devices 16") by an enterprise network 18. Users 12 interact with their respective computing devices to access enterprise business intelligence system 14. Users 12, computing devices 16A-16N, enterprise network 18, and enterprise business intelligence system 14 may all be either in a single facility or widely dispersed in two or more separate locations anywhere in the world, in different examples.

For exemplary purposes, various examples of the techniques of this disclosure may be readily applied to various software systems, including enterprise business intelligence systems or other large-scale enterprise software systems. Examples of enterprise software systems include enterprise financial or budget planning systems, order management systems, inventory management systems, sales force management systems, business intelligence tools, enterprise reporting tools, project and resource management systems, and other enterprise software systems.

In this example, enterprise BI system 14 includes servers that run BI dashboard web applications and may provide business analytics software. A user 12 may use a BI portal on a client computing device 16 to view and manipulate information such as business intelligence reports ("BI reports") and other collections and visualizations of data via their respective computing devices 16. This may include data from any of a wide variety of sources, including from multidimensional data structures and relational databases within enterprise 4, as well as data from a variety of external sources that may be accessible over public network 15.

Users 12 may use a variety of different types of computing devices 16 to interact with enterprise business intelligence system 14 and access data visualization tools and other resources via enterprise network 18. For example, an enterprise user 12 may interact with enterprise business intelligence system 14 and run a business intelligence (BI) portal (e.g., a business intelligence dashboard, etc.) using a laptop computer, a desktop computer, or the like, which may run a web browser. Alternatively, an enterprise user may use a smartphone, tablet computer, or similar device, running a business intelligence dashboard in a web browser, a dedicated mobile application, or other means for interacting with enterprise business intelligence system 14.

Enterprise network 18 and public network 15 may represent any communication network, and may include a packet-based digital network such as a private enterprise intranet or a public network like the Internet. In this manner, computing environment 10 can readily scale to suit large enterprises. Enterprise users 12 may directly access enterprise business intelligence system 14 via a local area network, or may remotely access enterprise business intelligence system 14 via a virtual private network, remote dial-up, or similar remote access communication mechanism.

BI system 14 may include a hierarchical data partitioning tool as described above. In one example, an enterprise user 12 may use an OLAP data analysis application to explore a database or other set of data available in enterprise 4, and to automatically generate a default hierarchical group based on the set of data. BI system 14 may classify columns or other data items from the set of data with respect to a library of ontological concepts and with respect to lexical correlations between the data items. BI system 14 may then generate a hierarchical group in which the data items are partitioned into hierarchical partitions based at least in part on the classifying with respect to the library of ontological concepts and the classifying with respect to lexical correlations. Each of the one or more hierarchical partitions may include two or more of the data items.

Figure 2:
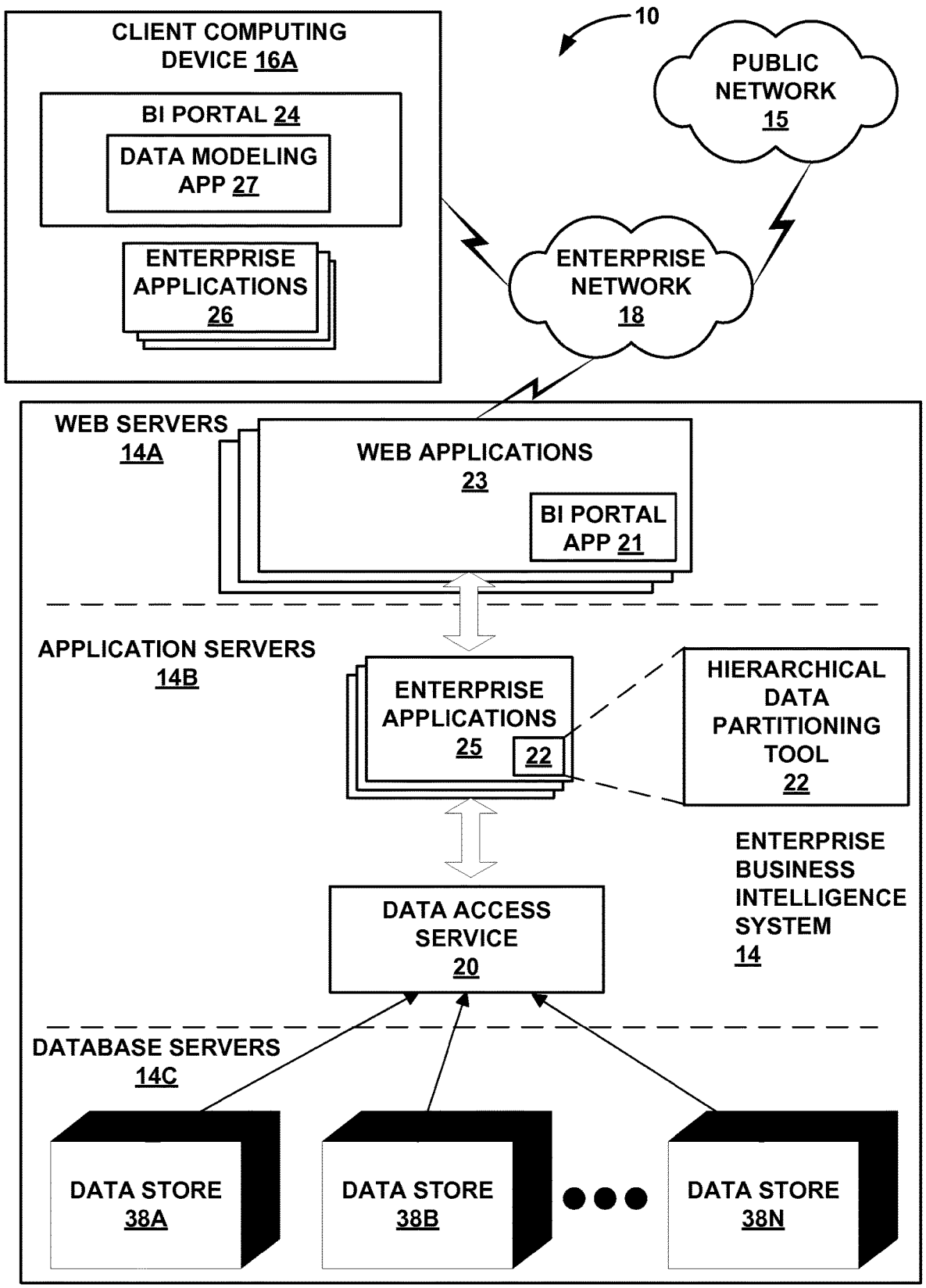
FIG. 2 is a block diagram illustrating one example of an enterprise business intelligence computing environment including a system for generating a hierarchical group based on a set of data, as part of a BI computing system.

FIG. 2 is a block diagram illustrating in further detail portions of one example of an enterprise business intelligence (BI) system 14. In this example implementation, a single client computing device 16A is shown for purposes of example and includes a BI portal 24 and one or more client-side enterprise software applications 26 that may utilize and manipulate multidimensional data, including to view data visualizations and analytical tools with BI portal 24. BI portal 24 may be rendered within a general web browser application, within a locally hosted application or mobile application, or other user interface. BI portal 24 may be generated or rendered using any combination of application software and data local to the computing device it's being generated on, and/or remotely hosted in one or more application servers or other remote resources.

BI portal 24 may include a data modeling application 27 (e.g., an OLAP application) or a client thereof that may render a graphical user interface (GUI) as part of BI portal 24 on client computing device 16A. BI portal 24 may output data visualizations for a user to view and manipulate in accordance with various techniques described in further detail below. BI portal 24 may present data in the form of charts or graphs that a user may manipulate, for example. BI portal 24 may present visualizations of data based on data from sources such as a BI report, e.g., that may be generated with enterprise business intelligence system 14, or another BI dashboard, as well as other types of data sourced from external resources through public network 15. BI portal 24 may present visualizations of data based on data that may be sourced from within or external to the enterprise.

FIG. 2 depicts additional detail for enterprise business intelligence system 14 and how it may be accessed via interaction with a BI portal 24 for depicting and providing visualizations of business data. BI portal 24 may provide visualizations of data that represents, provides data from, or links to any of a variety of types of data. BI portal 24 may also provide visualizations of data based on hierarchical groups generated by a hierarchical data partitioning tool 22, for example.

Hierarchical data partitioning tool 22 may be hosted among enterprise applications 25, as in the example depicted in FIG. 2, or may be hosted elsewhere, including on a client computing device 16A, or distributed among various computing resources in enterprise business intelligence system 14, in some examples. Hierarchical data partitioning tool 22 may be implemented as or take the form of a stand-alone application, a portion or add-on of a larger application, a library of application code, a collection of multiple applications and/or portions of applications, or other forms, and may be executed by any one or more servers, client computing devices, processors or processing units, or other types of computing devices.

As depicted in FIG. 2, enterprise business intelligence system 14 is implemented in accordance with a three-tier architecture: (1) one or more web servers 14A that provide web applications 23 with user interface functions, including a server-side BI portal application 21; (2) one or more application servers 14B that provide an operating environment for enterprise software applications 25 and a data access service 20; and (3) database servers 14C that provide one or more data sources 38A, 38B, . . . , 38N ("data sources 38"). Enterprise software applications 25 may include hierarchical data partitioning tool 22 as one of enterprise software applications 25 or as a portion or portions of one or more of enterprise software applications 25. The data sources 38 may include two-dimensional databases and/or multidimensional databases or data cubes. The data sources may be implemented using a variety of vendor platforms, and may be distributed throughout the enterprise. As one example, the data sources 38 may be multidimensional databases configured for data analysis modeling, such as Online Analytical Processing (OLAP). As another example, the data sources 38 may be multidimensional databases configured to receive and execute Multidimensional Expression (MDX) queries of some arbitrary level of complexity. As yet another example, the data sources 38 may be two-dimensional relational databases configured to receive and execute SQL queries, also with an arbitrary level of complexity. Any of data sources 38 may be available for hierarchical data partitioning tool 22 to analyze and classify its data items and generate a hierarchical group based thereon.

Multidimensional data structures are "multidimensional" in that each multidimensional data element is defined by a plurality of different object types, where each object is associated with a different dimension. The enterprise applications 26 on client computing device 16A may issue business queries to enterprise business intelligence system 14 to build reports. Enterprise business intelligence system 14 includes a data access service 20 that provides a logical interface to the data sources 38. Client computing device 16A may transmit query requests through enterprise network 18 to data access service 20. Data access service 20 may, for example, execute on the application servers intermediate to the enterprise software applications 25 and the underlying data sources in database servers 14C. Data access service 20 retrieves a query result set from the underlying data sources, in accordance with query specifications. Data access service 20 may intercept or receive queries, e.g., by way of an API presented to enterprise applications 26. Data access service 20 may then return this result set to enterprise applications 26 as BI reports, other BI objects, and/or other sources of data that are made accessible to BI portal 24 on client computing device 16A. These may include hierarchical groups generated by hierarchical data partitioning tool 22.

As described above and further below, hierarchical data partitioning tool 22 may be implemented in one or more computing devices, and may involve one or more applications or other software modules that may be executed on one or more processors. Example embodiments of the present disclosure may illustratively be described in terms of hierarchical data partitioning tool 22 in various examples described below. Hierarchical data partitioning tool 22 may generate hierarchical groups ready as dimensional hierarchies in a data analysis modeling application (e.g., OLAP) based on sets of data from data sources such as relational databases or multidimensional data cubes. An example based on hierarchical data partitioning tool 22 classifying data from a relational database and generating a hierarchical group based thereon is further described as follows.

Figure 3:
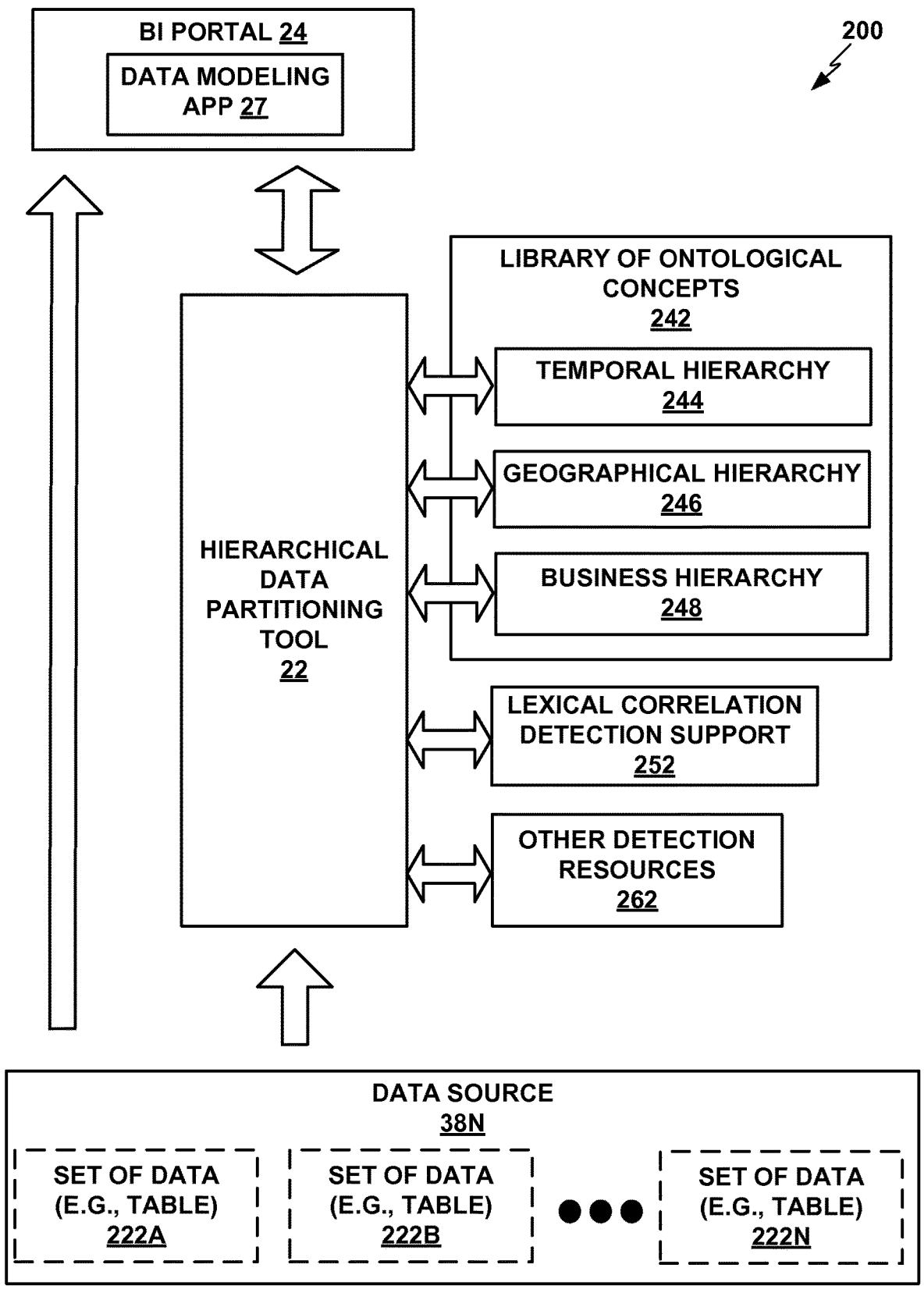
FIG. 3 is a conceptual block diagram illustrating in further detail portions of one example of an enterprise computing environment, in one example.

FIG. 3 is a conceptual block diagram illustrating in further detail portions of one embodiment of an enterprise computing environment 200. Computing environment 200 may be an implementation of corresponding portions of computing environment 10 shown in FIG. 2, and includes a data source 38N, a hierarchical data partitioning tool 22, a BI portal 24, and a data modeling app 27, as shown in FIG. 2 and described above. Data source 38N may be, e.g., a database, and may contain an arbitrary number of sets of data (e.g., database tables) 222A, 222B, etc. to 222N. Hierarchical data partitioning tool 22 may retrieve or receive a table 222N from data source 38N, classify and evaluate table 222N, generate a hierarchical group based at least in part on table 222N, and provide the generated hierarchical group to data modeling application 27 in BI portal 24. Data modeling application 27 may receive a table 222N from data source 38N and then provide table 222N to hierarchical data partitioning tool 22 in response to a user input to data modeling application 27. For example, hierarchical data partitioning tool 22 may receive an input via data modeling application 27 selecting table 222N or other set of data from data source 38N or other data store, and hierarchical data partitioning tool 22 may perform functions or processes to generate a hierarchical group in response to the receiving of the input selecting table 222N or other set of data.

Hierarchical data partitioning tool 22 has access to various resources including an ontology or library of ontological concepts 242, a lexical correlation detection support 252, and other detection resources 262. The library of ontological concepts 242 may include a temporal hierarchy 244, a geographical hierarchy 246, a business hierarchy 248, and other ontological conceptual hierarchies. Each of these ontologies may be or include a hierarchical category of concepts or a hierarchical classification of conceptual categories, related to temporal concepts, geographical concepts, and business concepts, respectively. Temporal hierarchy 244 may include data, information, and executable code related to describing a time category with hierarchical relationships among units of time, such as years, quarters, months, weeks, and days. Geographical hierarchy 246 may include data, information, and executable code related to a geography category describing hierarchical relationships among geographical units, such as regions or continents, countries, states or provinces, and cities or metropolitan areas.

Business hierarchy 248 may include or represent several individual libraries or categories of business-related ontological concepts with hierarchical relationships, such as a product category, a business organization hierarchy, and an accounting category. A product category may include a department hierarchical level, a product line hierarchical level, and a product hierarchical level. A business organization category may include a department hierarchical level, a manager hierarchical level, and an employee hierarchical level. An accounting category may include a revenue hierarchical level and a profit hierarchical level.

Lexical correlation detection support 252 may include data, information, executable code, and/or other resources that include or provide natural language dictionaries, natural language grammars, natural language thesauruses, or natural language processing (NLP) features, for example. Hierarchical data partitioning tool 22 may also perform some or all of its lexical correlation detection without using an external lexical correlation detection support 252. Hierarchical data partitioning tool 22 may use techniques such as detecting matching strings or detecting matching string portions among column headers, or detecting that a column header string portion includes one grammatical form of a word and searching other column headers for other grammatical forms of the same word, for example.

Thus, library of ontological concepts 242 may include one or more hierarchical classifications of categories. Hierarchical data partitioning tool 22 may make use of library of ontological concepts 242 in classifying columns or other data items with respect to library of ontological concepts 242. This may include hierarchical data partitioning tool 22 identifying one or more of the data items with one or more hierarchical levels in one of the hierarchical classifications of hierarchies 244, 246, 248 in library of ontological concepts 242. Each of the hierarchies 244, 246, 248 may include two or more hierarchical levels (e.g., hierarchical levels of years, quarters, and months in temporal hierarchy 244; hierarchical levels of continents/regions, countries, states/provinces (depending on the country), and cities or metropolitan areas in geographical hierarchy 246, etc.). One or more of these hierarchical levels in hierarchies 244, 246, 248 may also include one or more attributes.

Figure 4:
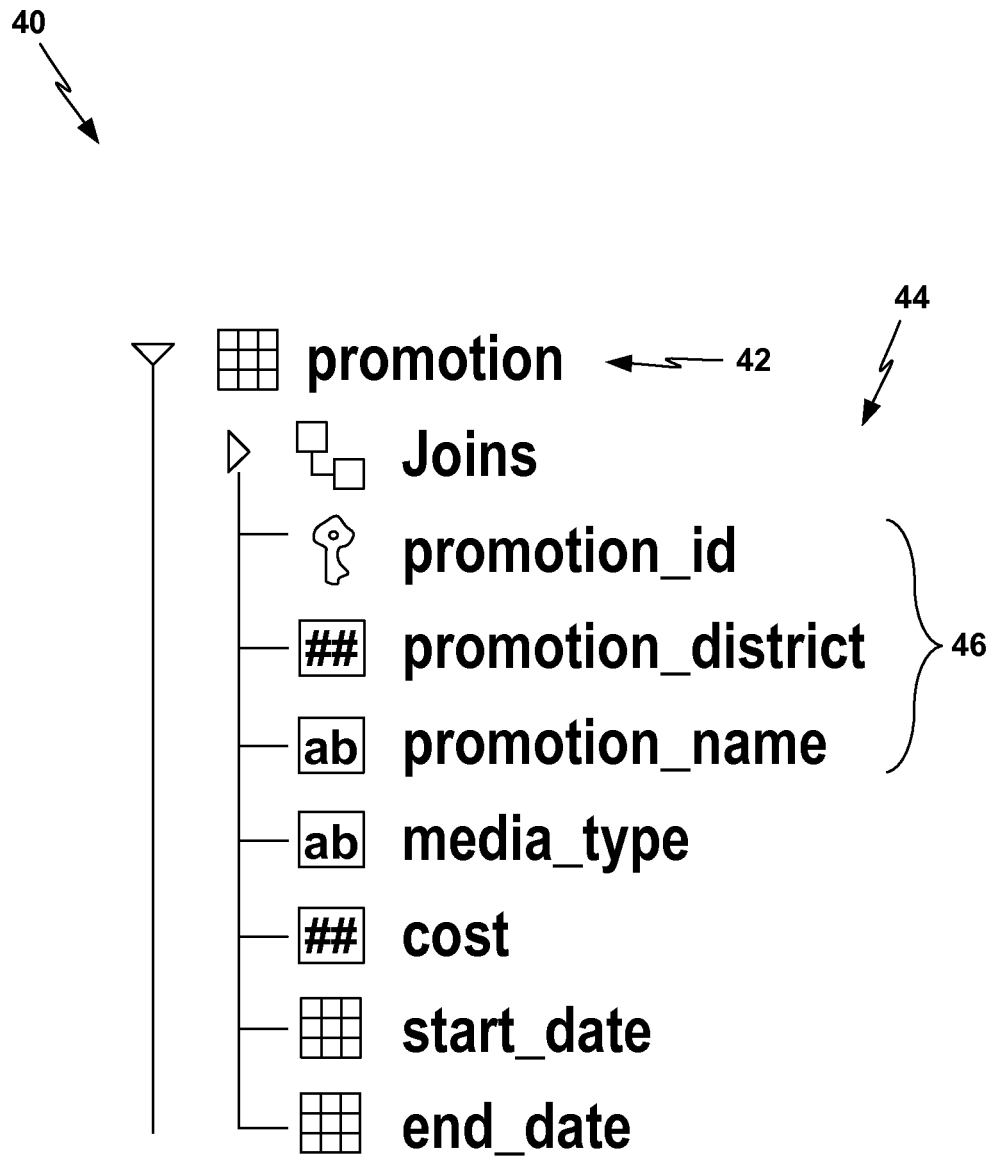
FIG. 4 is a diagram illustrating a table from a relational database as rendered in a graphical user interface (GUI) of a data modeling application, according to one example.

FIG. 4 depicts table 40 from a relational database as rendered in a graphical user interface (GUI) of a data modeling application 27 (e.g., an OLAP application) as shown in FIG. 2. Table 40 is an example of a set of data, and the relational database that includes table 40 is an example of a data source from which a user may select a set of data on which to execute hierarchical data partitioning tool 22, to cause hierarchical data partitioning tool 22 to generate a hierarchical group based on table 40. Table 40 includes a table header 42 entitled "promotion." Table header 42 is an example of a data item header for a set of data. Table 40 further includes columns 44 labeled "promotion_id," "promotion_district," "promotion_name," "media_type," "cost," "start_date," and "end_date." Columns 44 from table 40 are examples of data items from a set of data. Columns 44 may be thought of as containing inherent or latent hierarchical relationships that are not reflected in the flat organization of table 40. For example, several of columns 44 identify and/or describe a specific promotion, while other columns 44 indicate attributes of the promotion in other data types that have other relationships to each other, such as a start date and end date, which are both dates and which may be logically paired with each other.

Hierarchical data partitioning tool 22 may organize columns 44 from relational table 40 and/or other tables to a hierarchical group. A user may point to or otherwise select table 40 or other set of data from a relational database, and activate hierarchical data partitioning tool 22 to generate a default or initial hierarchical group based on table 40.

While the example of table 40 involving a commercial promotion is depicted in FIG. 4, in other examples, hierarchical data partitioning tool 22 may be used on tables that represent any kind of information. In some examples, a user may select a table representing various time indications and hierarchical data partitioning tool 22 may organize metadata of the table into a hierarchical group comprising hierarchical levels for year, quarter, month, day and various data items (e.g., columns) related to each of the levels of a hierarchical group.

One goal in data analysis modeling (e.g. OLAP) is to discern inherent or latent hierarchical relationships in a database or other data storage model and generate data hierarchies in a data analysis model that explicitly reflect those inherent or logical hierarchical relationships. As noted above, creating such data hierarchies in a data analysis model based on inherent or latent hierarchical relationships in a database or other data storage model is typically performed manually and carefully by data modeling experts with a good understanding of the underlying storage model. Hierarchical data partitioning tool 22 may perform processes of detecting inherent or latent hierarchical relationships in a database or other data storage model and generating a hierarchical group in which the two or more data items are partitioned into one or more hierarchical partitions, and present the hierarchical group to a user as a default or initial hierarchical group in a data analysis modeling application (e.g. OLAP). The user may then further modify or curate the generated default or initial hierarchical group if desired.

Hierarchical data partitioning tool 22 may include a means of detecting inherent or logical hierarchical relationships in database tables such as table 40, and incorporating those hierarchical relationships in a hierarchical group that hierarchical data partitioning tool 22 generates. Hierarchical data partitioning tool 22 may classify data items from table 40 with respect to a library of ontological concepts and with respect to lexical correlations between the data items. Hierarchical data partitioning tool 22 may generate a hierarchical group in which the data items are partitioned into one or more hierarchical partitions based at least in part on the classifying with respect to the library of ontological concepts and the classifying with respect to lexical correlations. Each of the hierarchical partitions may include two or more of the data items, which hierarchical data partitioning tool 22 may organize into two or more hierarchical levels. Hierarchical data partitioning tool 22 may present or provide the hierarchical group as an initial or default hierarchical group in a user interface for a data modeling application 27 (e.g., OLAP) and enable user inputs to modify the hierarchical group.

Hierarchical data partitioning tool 22 may make use of various sources of information, including an external library of ontological concepts, lexical correlations between data items, and sampling of the data items to determine hierarchical relationships, such as 1:1 (one-to-one) or 1:many (one-to-many) hierarchical relations. The library of ontological concepts may include representations of knowledge about useful hierarchical systems based on general knowledge domains such as time, geography, etc., or hierarchical systems based on business-specific knowledge domains such a product organization or a sales organization.

In one specific example directed to table 40 in FIG. 4, hierarchical data partitioning tool 22 may first evaluate various elements and information from table 40 such as table header 42, column headers of columns 44, data types (e.g., int (integer), of columns 44, and the data values of data fields in columns 44, in an attempt to understand what each column 44 (or other data item) represents. Hierarchical data partitioning tool 22 may also sample data from table 40 and determine information and/or statistical analysis based on the data from table 40, which may include data ranges in columns 44, numbers of distinct counts of data entries in columns 44, and density or sparsity of data entries in columns 44 (e.g., ratio of non-null data entries or null values to total number of data values).

Hierarchical data partitioning tool 22 may also classify columns 44 based on lexical correlations between columns, such as an analysis of similarities or relationships among column headings, such that hierarchical data partitioning tool 22 may classify columns with headers that have one or more elements in common to be designated to a single partition together. This heuristic recognizes naming conventions typically implemented by database administrators. In the example of FIG. 4, table 40, which may be directed to a sales promotion campaign, includes three columns 46 with headers that contain the string "promotion" as a portion of the column header.

Hierarchical data partitioning tool 22 may classify the three columns 46 as being correlated because they include a string portion in common between their column headers. Hierarchical data partitioning tool 22 may classify or identify the three columns 46 as being lexically correlated with each other since they all contain the same string (and the same statistically uncommon string, e.g., one that is not trivially common). Hierarchical data partitioning tool 22 may also classify or identify the three columns 46 as all directly describing or being related to a single concept in an ontological dictionary of business-related concepts, which may include a library entry for the ontological concept of a sales or marketing promotion. Hierarchical data partitioning tool 22 may thereby assign the three columns 46 to a single data partition of their own in a hierarchical group, potentially separate from data partitions to which the other columns among columns 44 may be assigned.

Hierarchical data partitioning tool 22 may also classify the columns or other data items of a table with respect to an external library of ontological concepts such as temporal or geographical hierarchies, as noted above. If hierarchical data partitioning tool 22 detects such an ontological-based hierarchical relationship among the columns of a table, hierarchical data partitioning tool 22 may use this information in any of various ways in generating a hierarchical data partition. For example, a geographical hierarchical relationship may include countries, states or provinces, and cities, and a temporal hierarchical relationship may include years, quarters, months, and weeks. In one example, hierarchical data partitioning tool 22 may assign the ontological-based hierarchical relationship (e.g., temporal or geographical) as a base level of a generated hierarchical data partition, and assign other columns outside the ontological-based hierarchical relationship as intermediate or leaf levels of the generated hierarchical data partition. Examples are further described below with reference to FIGS. 5 and 6.

Figure 5:
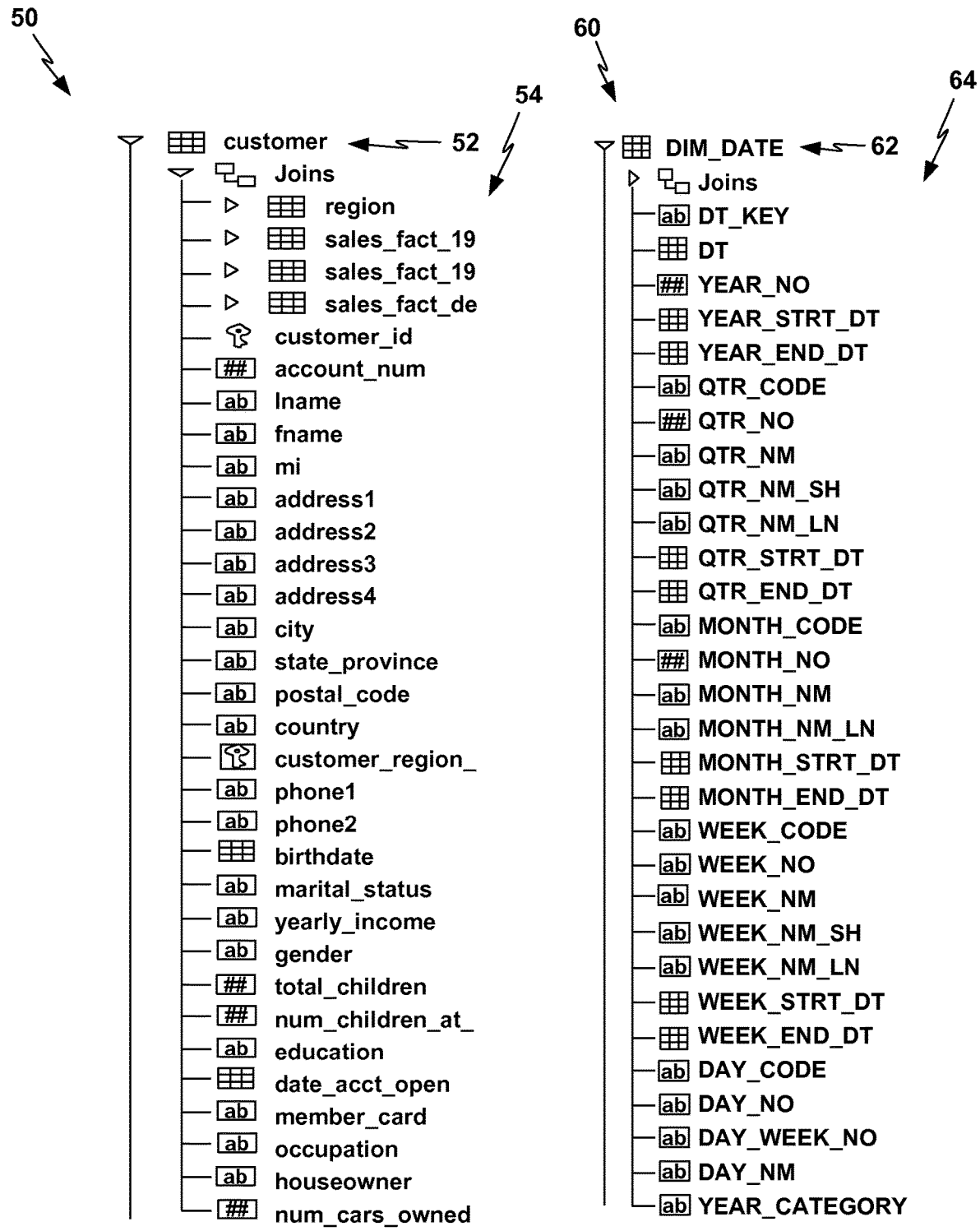
FIG. 5 is a diagram illustrating tables from a database as examples of sets of data from a data source, according to one example.

FIG. 5 shows two tables 50 and 60 from a database, as examples of sets of data from a data source. Table 50 has a table header 52 containing the string "customer" and a number of columns 54. Table 60 has a table header 62 containing the string "DIM_DATE" and a number of columns 64. Hierarchical data partitioning tool 22 may analyze tables 50 and 60 and classify tables 50 and 60 with respect to a library of ontological concepts including geographical and temporal hierarchical relationships. Hierarchical data partitioning tool 22, classifying with respect to a library of ontological concepts, may detect a significant number of columns 54 in table 50 that pertain to geographical hierarchical relationships, and may detect a significant number of columns 64 in table 60 that pertain to temporal hierarchical relationships.

Hierarchical data partitioning tool 22 may then determine that geographical hierarchical relationships are of primary significance to table 50, and begin generating a hierarchical group based on table 50 with a geographical hierarchy as its base. Hierarchical data partitioning tool 22 may then assign columns 54 of table 50 with detected geographical hierarchical relationships to a base level of the generated hierarchical group, and assign some or all of the remaining of columns 54 that lack a detected geographical hierarchical relationship to a leaf level (or to one or more intermediate levels) of the generated hierarchical group. For example, several of columns 54 have headers with geographical connotations such as "address1," "address2," "address3," "address4," "city," "state_province," "postal code," "country," and "customer_region," that may match strings that correlate to corresponding geographical hierarchical concepts as indicated in a geographical section of a library of ontological concepts. These several headers are listed in a flat organization in table 50 without any logical distinction from other columns without geographical significance, and without relating how the geographically defined columns might be related to one another, such that a rich body of information about the data in table 50 is not reflected in the organization of table 50, but that may be reflected in a hierarchical group generated by hierarchical data partitioning tool 22 (described further below).

Similarly, hierarchical data partitioning tool 22 may determine that temporal hierarchical relationships are of primary significance to table 60, and begin generating a hierarchical group based on table 60 with a temporal hierarchy as its base. Hierarchical data partitioning tool 22 may then assign columns 64 of table 60 with detected temporal hierarchical relationships to a base level of the generated hierarchical group, and assign some or all of the remaining of columns 54 that lack a detected temporal hierarchical relationship to a leaf level (or to one or more intermediate levels) of the generated hierarchical group. For example, most of columns 64 have headers that include temporal connotations such as "year," "qtr," "month," "week," and "day," that may match strings that correlate to corresponding temporal hierarchical concepts as indicated in a temporal section of a library of ontological concepts. As noted above for table 50, the column headers in table 60 are also simply listed in a flat organization in table 60 without any logical distinction from other columns without temporal significance, and also without relating how the temporally defined columns might be related to one another, such that a rich body of information about the data in table 60 is not reflected in the organization of table 60, but that may be reflected in a hierarchical group generated by hierarchical data partitioning tool 22 (described further below).

Figure 6:
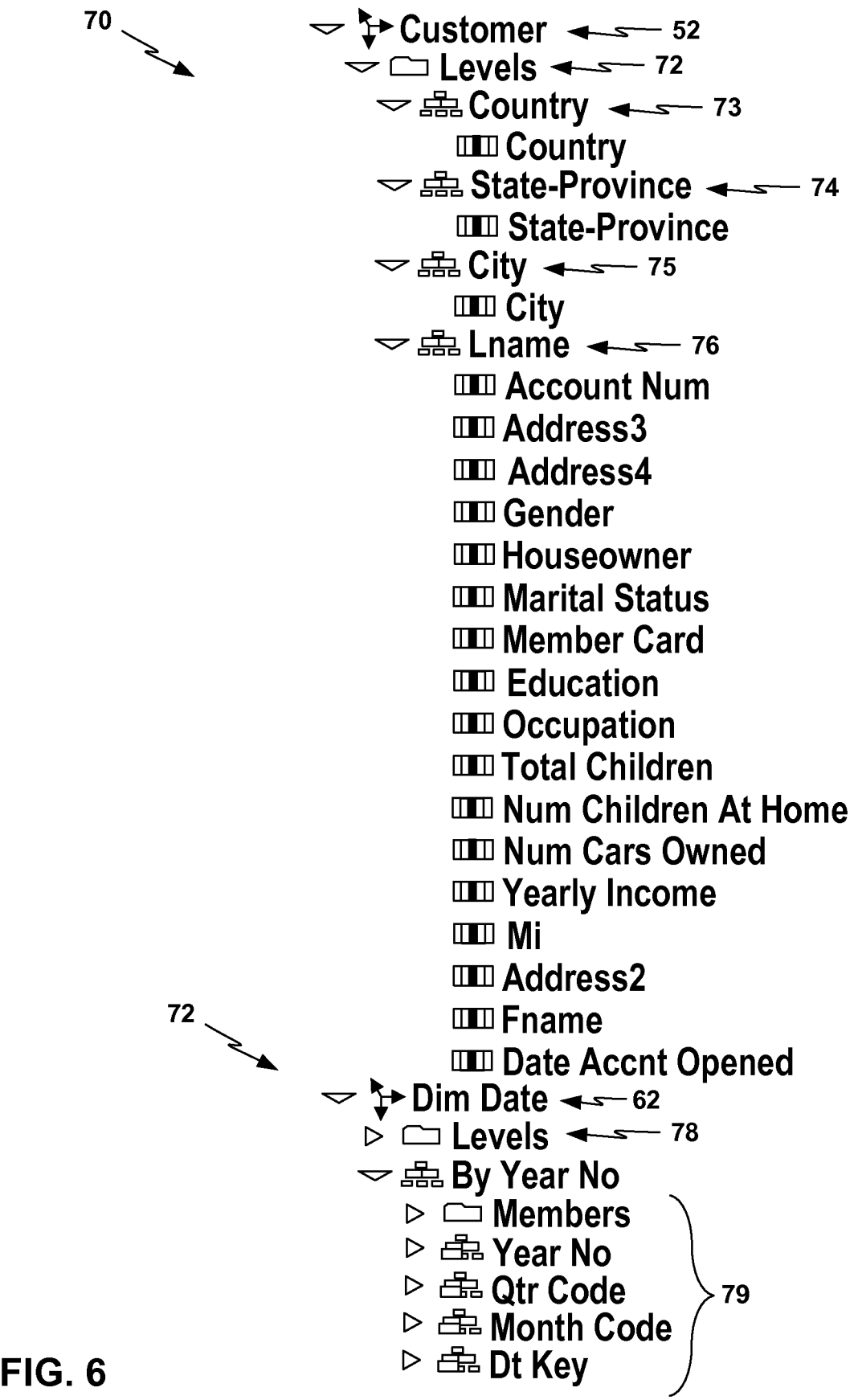
FIG. 6 is a diagram showing hierarchical groups generated by a hierarchical data partitioning tool based on tables from a database, according to one example.

FIG. 6 shows hierarchical groups 70 and 72 generated by hierarchical data partitioning tool 22 based on tables 50 and 60, respectively, shown in FIG. 5 and organized by hierarchical data partitioning tool 22 as described in part above. Hierarchical groups 70 and 72 include all the columns 54 and 64 of tables 50 and 60, respectively, from a single database as described above, but now organized in a way that reflects greater information about the data in tables 50 and 60 than was reflected in tables 50 and 60 as present in their database. Hierarchical group 70 includes table header 52 from table 50, and a "levels" element 72 that facilitates access to base and leaf levels of hierarchical group 70. Hierarchical group 70 includes a geographically organized base level defined to include geographically hierarchically organized groups 73, 74, 75, 76, including "country" group 73, "state/province" group 74, "city" group 75, and "lname" (or "last name") group 76. These hierarchical groups 73, 74, 75, 76 then include the columns 54 from table 50 arranged at leaf levels within the appropriate hierarchical groups.

Similarly, hierarchical group 72 includes table header 62 from table 60, and a "levels" element 78 that facilitates access to base and leaf levels of hierarchical group 72. Hierarchical group 72 includes a temporally organized base level defined to include temporally hierarchically organized partitions 79, including a "members" partition, a "year no." partition, a "qtr. code" partition, a "month code" partition, and a "dt. key" partition. These partitions 79 then include the columns 64 from table 60 arranged at leaf levels within the appropriate partitions (not individually shown in the collapsed view of FIG. 6). Hierarchical group 72 may thereby provide the information inherent in columns 64 in a more explicitly organized and useful format than in table 60.

Hierarchical data partitioning tool 22 may use additional means of classifying or detecting hierarchical relationships with respect to additional resources or factors. Hierarchical data partitioning tool 22 may also evaluate whether or how well a hierarchical group being generated displays clear hierarchical relationships based on classifying with respect to the library of ontological concepts and/or based on classifying with respect to lexical correlations between the two or more data items. Hierarchical data partitioning tool 22 may evaluate which of one or more factors contributes more to defining hierarchical relationships among data items in a set of data, and how to assign the data items to partitions in the hierarchical data partitions that hierarchical data partitioning tool 22 generates.

Referring again to the example of the promotions table 40 shown in FIG. 4, after hierarchical data partitioning tool 22 classifies columns 44 from table 40 with respect to a library of ontological concepts and with respect to lexical correlations between columns 44, hierarchical data partitioning tool 22 may also perform additional analysis on columns 44. For example, hierarchical data partitioning tool 22 may classify columns 44 (or other data items) based on a set of heuristic rules. In some examples, hierarchical data partitioning tool 22 may discount or disqualify certain quantifiers or metrics, such as the "cost" column from table 40, as being unlikely to logically form categories for data partitions. As another example, hierarchical data partitioning tool 22 may discount or disqualify columns with temporal data types (timestamp, date etc., such as the start- and end-date columns in table 40) from serving as a basis for a hierarchical partition.

Hierarchical data partitioning tool 22 may also sample the columns from table 40 to evaluate relative cardinality, such as 1:1 (one-to-one) or 1:many (one-to-many), between columns as potential clues to hierarchical relationships, and hierarchical data partitioning tool 22 may seek to determine hierarchical relationships based on such relative cardinality between columns. For example, hierarchical data partitioning tool 22 may determine that columns directed to employee names and employee ID numbers have a 1:1 correspondence or approximately a 1:1 correspondence between each other. For columns determined to have a 1:1 correspondence, hierarchical data partitioning tool 22 may evaluate whether to assign the columns to parallel leaf positions in a leaf level of a hierarchical partition, or whether the columns may be merged. Hierarchical data partitioning tool 22 may also seek to evaluate whether to assign columns having a 1:many hierarchical relationship or other low to high cardinality relationship to respective base and leaf levels of a hierarchical data partition (or to other corresponding dependent hierarchical arrangement such as base and intermediate levels or intermediate and leaf levels).

Hierarchical data partitioning tool 22 may classify data items with respect to any of the above or other factors or resources, and may use one or more criteria in determining how to assign the data items to hierarchical data partitions. Hierarchical data partitioning tool 22 may determine how, with respect to classifications, indications, factors or resources hierarchical data partitioning tool 22 has used in evaluating the data items, to assign the data items to hierarchical data partitions. In some examples, hierarchical data partitioning tool 22 may select a set of assignments that increases or maximizes the number of partitions into which the data items may be organized. In some other examples, hierarchical data partitioning tool 22 may select a particular partitioning factor as the primary basis for partitioning, such as geographical ontology, temporal ontology, product category ontology, business organization ontology, or lexical correlations among column headers, or a combination of the above, for example. In some examples, hierarchical data partitioning tool 22 may also modify the assignments of columns (or other data items) to partitions from a primary basis for partitioning to account for other relevant factors or attributes, such as start dates and end dates grouped in a partition with a group of data items the rest of which share an ontological hierarchy or lexical correlation, for example.

Figure 7:
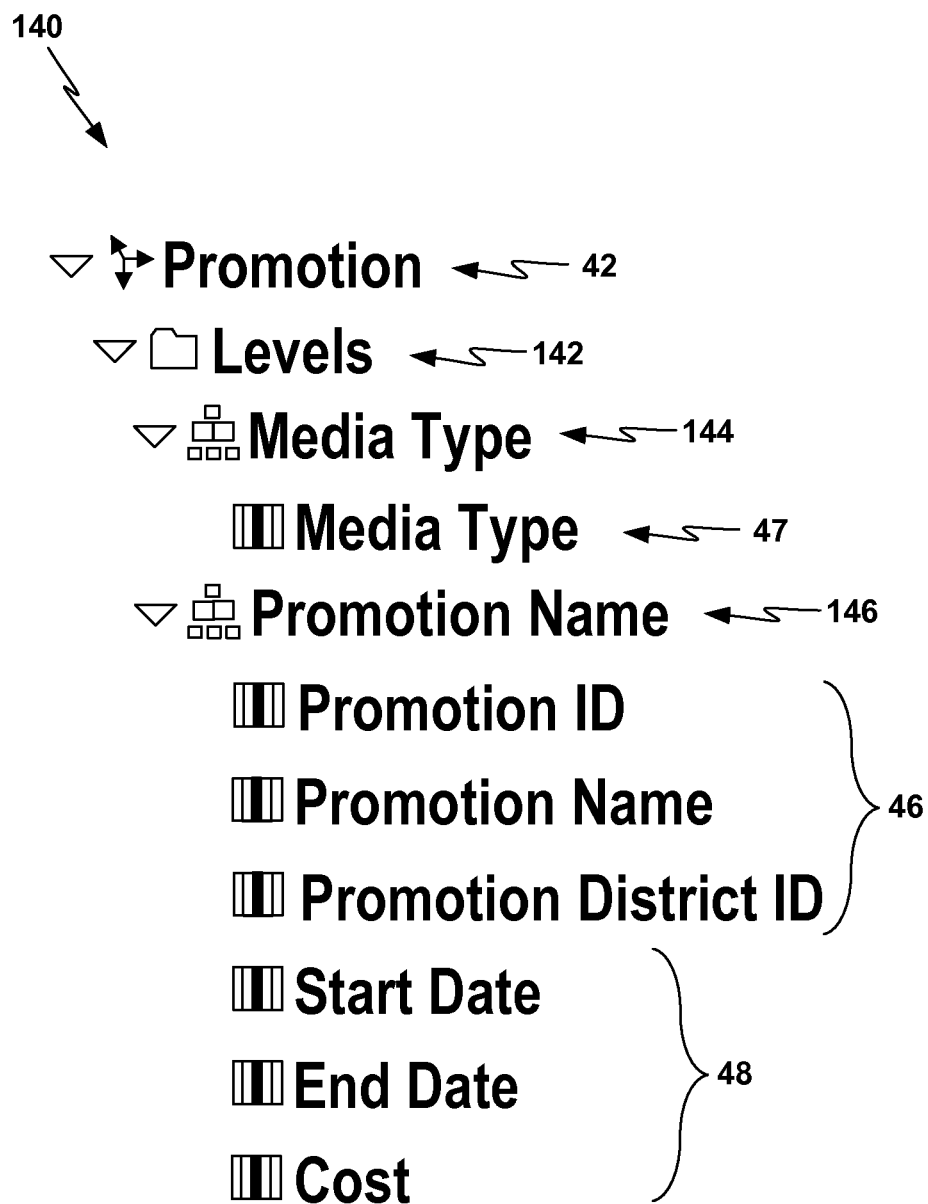
FIG. 7 is a diagram showing a hierarchical group that a hierarchical data partitioning tool may generate based on a table, including by classifying columns from the table with respect to a library of ontological concepts and with respect to lexical correlations between columns, according to one example.

FIG. 7 shows a hierarchical group 140 that hierarchical data partitioning tool 22 may generate based on table 40 of FIG. 4 using processes described above, including by classifying columns 44 from table 40 with respect to a library of ontological concepts and with respect to lexical correlations between columns 44. Hierarchical group 140 includes table header 42 with the string "promotions" as shown in table 40 in FIG. 4. Hierarchical group 140 also includes a "levels" element 142 that facilitates access to base and leaf levels of hierarchical group 140. Hierarchical group 140 further includes two data partitions 144 and 146, a "media type" partition 144 and a "promotion name" partition 146. Hierarchical data partitioning tool 22 has assigned a "media type" column 47 from table 40 to the "media type" partition 144 and has assigned several columns from table 40 to "promotion name" partition 146, including three columns 46 that include the string "promotion" in their column headers, plus three additional columns 48.

As noted above, hierarchical data partitioning tool 22 may classify or identify the three columns 46 as being lexically correlated with each other since they all contain the same string (and the same statistically uncommon string, e.g., one that is not trivially common). Hierarchical data partitioning tool 22 may also classify or identify the three columns 46 as all directly describing or being related to a single concept in an ontological dictionary of business-related concepts, which may include a library entry for the ontological concept of a sales or marketing promotion. Hierarchical data partitioning tool 22 may also use both of these classification criteria together in selecting to assign the explicitly promotion-related columns 46 to a single partition 146 in common.

Hierarchical data partitioning tool 22 may also assign columns 48 to "promotion name" partition 146 based on criteria that include classifying columns 48 with respect to a library of ontological concepts as being directly and intrinsically relevant to the sales or marketing promotion described by columns 46. Columns 48 include a "start date" column, an "end date" column, and a "cost" column that hierarchical data partitioning tool 22 may determine, by classifying with respect to a business concept ontology library that describes business concepts, are intrinsically related to the sales or marketing promotion described by promotion columns 46. Hierarchical data partitioning tool 22 may determine, in part by evaluating the data types of the columns and classifying the columns of table 40 with respect to a business ontology library, that the data types of the values in the "start date" column and "end date" column are for dates, that the dates are in paired values with the "end date" column values encoding dates subsequent to the "start date" column values, and that this arrangement correlates with indications in the business ontology library of the concept of start dates and end dates for a sales or marketing promotion. Hierarchical data partitioning tool 22 may determine, in part by evaluating the data types of the columns and classifying the columns of table 40 with respect to a business ontology library, that the data types of the values in the "cost" column are for monetary values, and that the string "cost" and the data types conform to a business concept, described in the business ontology library, of a cost, expense, or outlay associated with a sales or marketing promotion.

Hierarchical data partitioning tool 22 may thereby determine that the "start date," "end date," and "cost" columns 48 are directly and intrinsically relevant to the promotion described by promotion-describing columns 46, and may thereby assign the "start date," "end date," and "cost" columns 48 to the same "promotion name" hierarchical data partition 146 along with the promotion-describing columns 46. Hierarchical data partitioning tool 22 may determine that the "media type" column 144 is not directly and intrinsically relevant to the promotion described by promotion-describing columns 46, and assign the "media type" column 144 to a different hierarchical data partition 144. In other examples, hierarchical data partitioning tool 22 may use various other criteria in determining how to assign columns or other data items from a table or other set of data to hierarchical data partitions, and/or may make other determinations in assigning the columns of table 40 to partitions in a hierarchical group.

Thus, generally, columns 48 or other data items may include one or more properties including one or more of: data item headings of the one or more data items, data types defined for the one or more data items, data values in data fields comprised in the one or more data items, or density of data in the one or more data items. Hierarchical data partitioning tool 22 classifying the two or more data items with respect to the library of ontological concepts may include detecting one or more correlations between the one or more properties of the two or more data items and one or more ontological concepts from the library of ontological concepts. Hierarchical data partitioning tool 22 generating the hierarchical group may include hierarchical data partitioning tool 22 selecting one of the data items as a base level (e.g., "media type" partition 144, "promotion name" partition 146) of a particular hierarchical partition from the hierarchical partitions, and selecting at least one other of the data items as at least one leaf level (e.g., columns 46, columns 48) of the particular hierarchical partition.

Hierarchical data partitioning tool 22 may also measure correlations between data in the two or more data items in a particular hierarchical partition from the hierarchical partitions to verify sampling of the data in the particular hierarchical partition. Verifying sampling of the data may include confirming the particular hierarchical partition, or modifying an arrangement of the two or more data items in the particular hierarchical partition. Verifying the sampling of the data may include determining whether one or more sampling criteria for the two or more data items in the particular hierarchical partition correspond to a one-to-one hierarchical relation or to a one-to-many hierarchical relation, and either confirming that the particular hierarchical partition does not have a data item at a leaf level of the particular hierarchical partition in a one-to-many relationship with a data item at a base level of the particular hierarchical partition, or modifying the arrangement of the two or more data items in the particular hierarchical partition such that the particular hierarchical partition does not have a data item at a leaf level of the particular hierarchical partition in a one-to-many relationship with a data item at a base level of the particular hierarchical partition.

Figure 8:
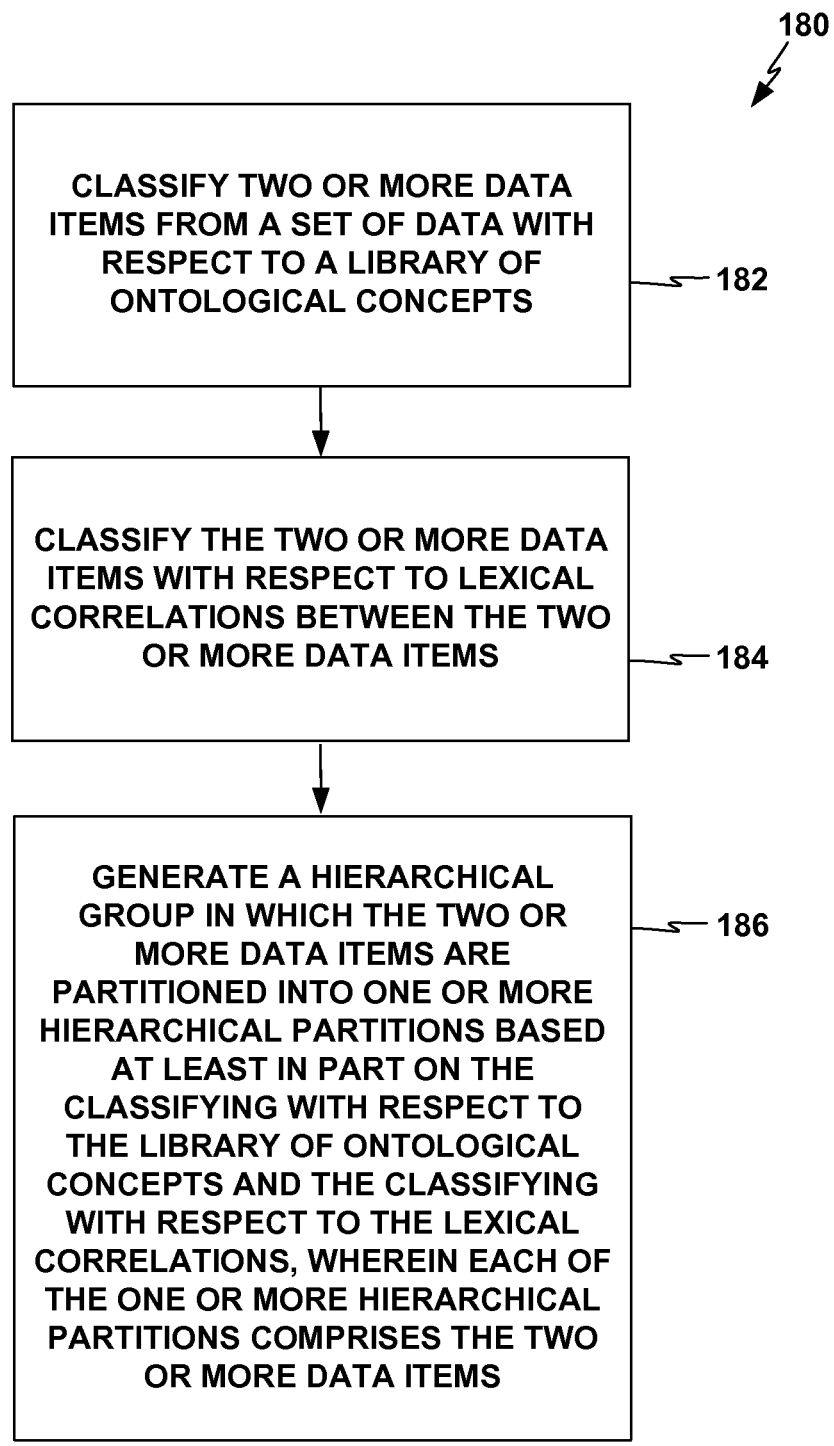
FIG. 8 is a diagram illustrating a process for generating a hierarchical group based on a set of data, according to one example.

FIG. 8 shows a flowchart for an example overall process 180 that hierarchical data partitioning tool 22 or other tool, system, program, library, or other resource, executing on one or more computing devices (e.g., servers, computers, processors, etc.), may perform. Hierarchical data partitioning tool 22 may classify two or more data items from a set of data (e.g., columns 44 from database table 40 as in FIG. 4, columns 54 from database table 50 or columns 64 from database table 60 as in FIG. 5, data items from a set of data 222A-222N as in FIG. 3) with respect to a library of ontological concepts (e.g., library of ontological concepts 242 or particular hierarchies 244, 246, 248 as shown in FIG. 3) (182). Hierarchical data partitioning tool 22 may classify the two or more data items (e.g., as noted above) with respect to lexical correlations between the two or more data items (e.g., with external lexical correlation detection support 252 or with its own internal techniques, as described above with reference to FIG. 3) (184). Hierarchical data partitioning tool 22 may generate a hierarchical group in which the two or more data items are partitioned into one or more hierarchical partitions based at least in part on the classifying with respect to the library of ontological concepts and the classifying with respect to lexical correlations, wherein each of the one or more hierarchical partitions comprises two or more of the data items (e.g., as described above with reference to FIGS. 3-7) (186).

Figure 9:
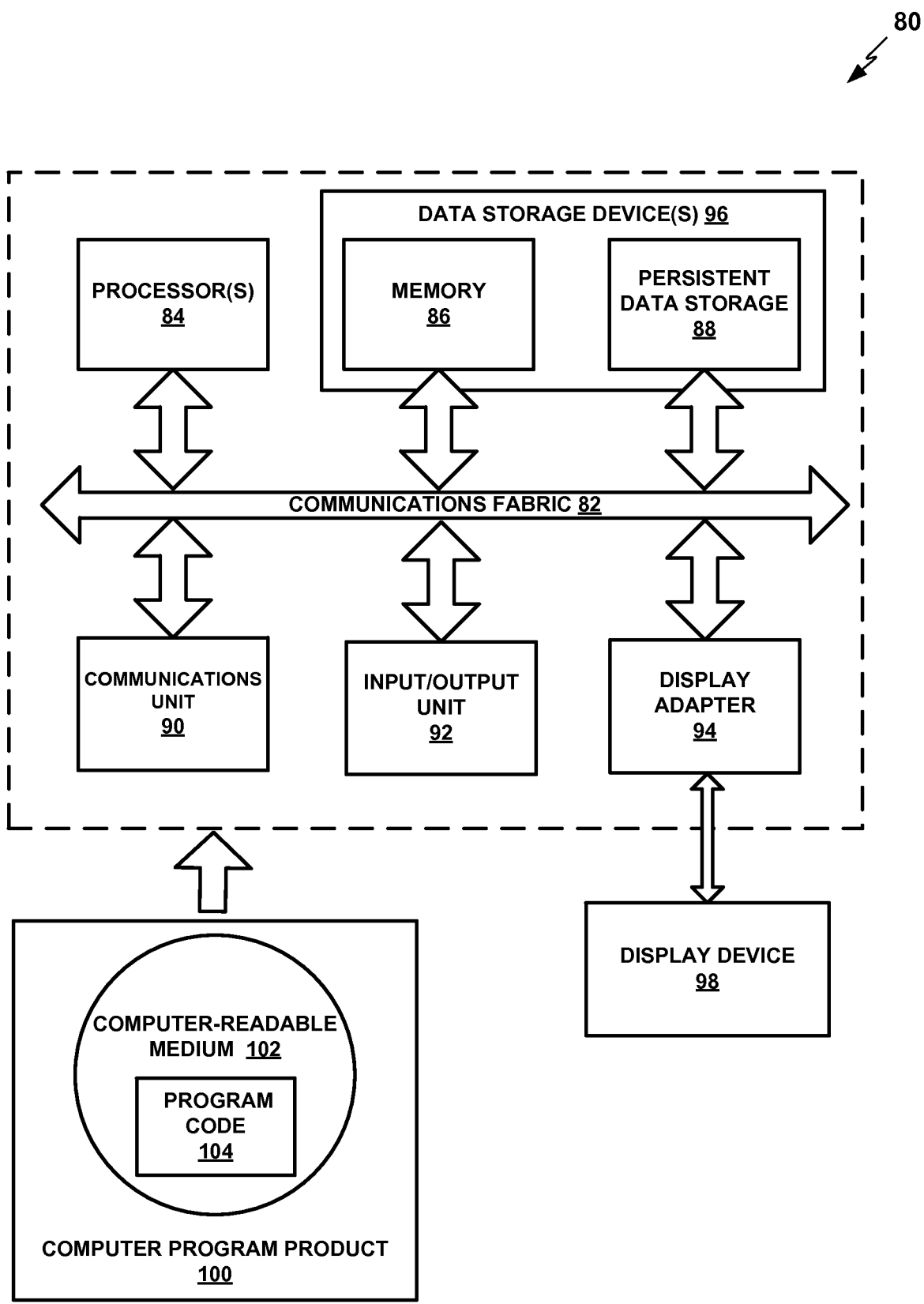
FIG. 9 is a block diagram of a computing device that may execute a system for generating a hierarchical group based on a set of data, according to one example.

FIG. 9 is a block diagram of a computing device 80 that may be used to execute a hierarchical data partitioning tool 22, according to an illustrative example. Computing device 80 may be a server such as one of web servers 14A or application servers 14B as depicted in FIG. 2. Computing device 80 may also be any server for providing an enterprise business intelligence application in various examples, including a virtual server that may be run from or incorporate any number of computing devices. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 80 may include a computer having capabilities or formats other than or beyond those described herein.

In the illustrative example of FIG. 9, computing device 80 includes communications fabric 82, which provides communications between processor unit 84, memory 86, persistent data storage 88, communications unit 90, and input/output (I/O) unit 92. Communications fabric 82 may include a dedicated system bus, a general system bus, multiple buses arranged in hierarchical form, any other type of bus, bus network, switch fabric, or other interconnection technology. Communications fabric 82 supports transfer of data, commands, and other information between various subsystems of computing device 80.

Processor unit 84 may be a programmable central processing unit (CPU) configured for executing programmed instructions stored in memory 86. In another illustrative example, processor unit 84 may be implemented using one or more heterogeneous processor systems in which a main processor is present with secondary processors on a single chip. In yet another illustrative example, processor unit 84 may be a symmetric multi-processor system containing multiple processors of the same type. Processor unit 84 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 84 may include a multi-core processor, such as a dual core or quad core processor, for example. Processor unit 84 may include multiple processing chips on one die, and/or multiple dies on one package or substrate, for example. Processor unit 84 may also include one or more levels of integrated cache memory, for example. In various examples, processor unit 84 may comprise one or more CPUs distributed across one or more locations.

Data storage 96 includes memory 86 and persistent data storage 88, which are in communication with processor unit 84 through communications fabric 82. Memory 86 can include a random access semiconductor memory (RAM) for storing application data, i.e., computer program data, for processing. While memory 86 is depicted conceptually as a single monolithic entity, in various examples, memory 86 may be arranged in a hierarchy of caches and in other memory devices, in a single physical location, or distributed across a plurality of physical systems in various forms. While memory 86 is depicted physically separated from processor unit 84 and other elements of computing device 80, memory 86 may refer equivalently to any intermediate or cache memory at any location throughout computing device 80, including cache memory proximate to or integrated with processor unit 84 or individual cores of processor unit 84.

Persistent data storage 88 may include one or more hard disc drives, solid state drives, flash drives, rewritable optical disc drives, magnetic tape drives, or any combination of these or other data storage media. Persistent data storage 88 may store computer-executable instructions or computer-readable program code for an operating system, application files comprising program code, data structures or data files, and any other type of data. These computer-executable instructions may be loaded from persistent data storage 88 into memory 86 to be read and executed by processor unit 84 or other processors. Data storage 96 may also include any other hardware elements capable of storing information, such as, for example and without limitation, data, program code in functional form, and/or other suitable information, either on a temporary basis and/or a permanent basis.

Persistent data storage 88 and memory 86 are examples of physical, tangible, non-transitory computer-readable data storage devices. Data storage 96 may include any of various forms of volatile memory that may require being periodically electrically refreshed to maintain data in memory, while those skilled in the art will recognize that this also constitutes an example of a physical, tangible, non-transitory computer-readable data storage device. Executable instructions may be stored on a non-transitory medium when program code is loaded, stored, relayed, buffered, or cached on a non-transitory physical medium or device, including if only for only a short duration or only in a volatile memory format.

Processor unit 84 can also be suitably programmed to read, load, and execute computer-executable instructions or computer-readable program code for a hierarchical data partitioning tool 22, as described in greater detail above. This program code may be stored on memory 86, persistent data storage 88, or elsewhere in computing device 80. This program code may also take the form of program code 104 stored on computer-readable medium 102 comprised in computer program product 100, and may be transferred or communicated, through any of a variety of local or remote means, from computer program product 100 to computing device 80 to be enabled to be executed by processor unit 84, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 84 can be suitably programmed to read, load, and execute instructions of the operating system.

Communications unit 90, in this example, provides for communications with other computing or communications systems or devices. Communications unit 90 may provide communications through the use of physical and/or wireless communications links. Communications unit 90 may include a network interface card for interfacing with a LAN 16, an Ethernet adapter, a Token Ring adapter, a modem for connecting to a transmission system such as a telephone line, or any other type of communication interface. Communications unit 90 can be used for operationally connecting many types of peripheral computing devices to computing device 80, such as printers, bus adapters, and other computers. Communications unit 90 may be implemented as an expansion card or be built into a motherboard, for example.

The input/output unit 92 can support devices suited for input and output of data with other devices that may be connected to computing device 80, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 92 may also include any type of interface for video output in any type of video output protocol and any type of monitor or other video display technology, in various examples. It will be understood that some of these examples may overlap with each other, or with example components of communications unit 90 or data storage 96. Input/output unit 92 may also include appropriate device drivers for any type of external device, or such device drivers may reside elsewhere on computing device 80 as appropriate.

Computing device 80 also includes a display adapter 94 in this illustrative example, which provides one or more connections for one or more display devices, such as display device 98, which may include any of a variety of types of display devices. It will be understood that some of these examples may overlap with example components of communications unit 90 or input/output unit 92. Input/output unit 92 may also include appropriate device drivers for any type of external device, or such device drivers may reside elsewhere on computing device 80 as appropriate. Display adapter 94 may include one or more video cards, one or more graphics processing units (GPUs), one or more video-capable connection ports, or any other type of data connector capable of communicating video data, in various examples. Display device 98 may be any kind of video display device, such as a monitor, a television, or a projector, in various examples.

Input/output unit 92 may include a drive, socket, or outlet for receiving computer program product 100, which comprises a computer-readable medium 102 having computer program code 104 stored thereon. For example, computer program product 100 may be a CD-ROM, a DVD-ROM, a Blu-Ray disc, a magnetic disc, a USB stick, a flash drive, or an external hard disc drive, as illustrative examples, or any other suitable data storage technology.

Computer-readable medium 102 may include any type of optical, magnetic, or other physical medium that physically encodes program code 104 as a binary series of different physical states in each unit of memory that, when read by computing device 80, induces a physical signal that is read by processor 84 that corresponds to the physical states of the basic data storage elements of storage medium 102, and that induces corresponding changes in the physical state of processor unit 84. That physical program code signal may be modeled or conceptualized as computer-readable instructions at any of various levels of abstraction, such as a high-level programming language, assembly language, or machine language, but ultimately constitutes a series of physical electrical and/or magnetic interactions that physically induce a change in the physical state of processor unit 84, thereby physically causing or configuring processor unit 84 to generate physical outputs that correspond to the computer-executable instructions, in a way that causes computing device 80 to physically assume new capabilities that it did not have until its physical state was changed by loading the executable instructions comprised in program code 104.

In some illustrative examples, program code 104 may be downloaded over a network to data storage 96 from another device or computer system for use within computing device 80. Program code 104 comprising computer-executable instructions may be communicated or transferred to computing device 80 from computer-readable medium 102 through a hard-line or wireless communications link to communications unit 90 and/or through a connection to input/output unit 92. Computer-readable medium 102 comprising program code 104 may be located at a separate or remote location from computing device 80, and may be located anywhere, including at any remote geographical location anywhere in the world, and may relay program code 104 to computing device 80 over any type of one or more communication links, such as the Internet and/or other packet data networks. The program code 104 may be transmitted over a wireless Internet connection, or over a shorter-range direct wireless connection such as wireless LAN, Bluetooth™, Wi-Fi™, or an infrared connection, for example. Any other wireless or remote communication protocol may also be used in other implementations.

The communications link and/or the connection may include wired and/or wireless connections in various illustrative examples, and program code 104 may be transmitted from a source computer-readable medium 102 over non-tangible media, such as communications links or wireless transmissions containing the program code 104. Program code 104 may be more or less temporarily or durably stored on any number of intermediate tangible, physical computer-readable devices and media, such as any number of physical buffers, caches, main memory, or data storage components of servers, gateways, network nodes, mobility management entities, or other network assets, en route from its original source medium to computing device 80.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for generating a hierarchical group based on a set of data, the method comprising:

classifying two or more data items from a set of data with respect to a library of ontological concepts based at least in part on properties of the two or more data items, including detecting correlations between the properties of the two or more data items and one or more ontological concepts from the library of ontological concepts, wherein the properties of the two or more data items include data types defined for the two or more data items and ranges of data values in data fields of the two or more data items;

classifying the two or more data items with respect to lexical correlations between the two or more data items, including determining correlations between one or more elements of headers of the two or more data items;

analyzing the two or more data items based on one or more factors to determine whether the one or more factors contribute to defining a hierarchical relationship, wherein the analysis utilizes the one or more factors that comprise a set of heuristic rules and relative cardinality, wherein the set of heuristic rules discounts or disqualifies quantifiers or metrics associated with the two or more data items, and wherein the relative cardinality minimizes quantifiers or metrics through merging;

generating a hierarchical group in which the two or more data items are partitioned into one or more hierarchical partitions based at least in part on the classifying with respect to the library of ontological concepts, the classifying with respect to the lexical correlations, and the analysis of the two or more data items based on the one or more factors, wherein each of the one or more hierarchical partitions comprises the two or more data items; and verifying a sampling of data in the one or more hierarchical partitions, including measuring correlations between data in the two or more data items in a particular hierarchical partition from the one or more hierarchical partitions to determine whether the particular hierarchical partition has a first data item at a leaf level of the particular hierarchical partition in a one-to-many relationship with a second data item at a base level of the particular hierarchical partition.

2. The method of claim 1, wherein the properties of the two or more data items further include one or more of: numbers of distinct counts of data entries in the two or more data items or density of data in the two or more data items.

3. The method of claim 1, wherein generating the hierarchical group comprises selecting one of the two or more data items as the base level of the particular hierarchical partition from the hierarchical partitions, and selecting at least one other of the two or more data items as at least one leaf level of the particular hierarchical partition.

4. The method of claim 1, wherein verifying the sampling of the data further includes modifying an arrangement of the two or more data items in the particular hierarchical partition.

5. The method of claim 1, wherein verifying the sampling of the data further includes modifying the arrangement of the two or more data items in the particular hierarchical partition such that the particular hierarchical partition does not have a data item at the leaf level of the particular hierarchical partition in a one-to-many relationship with a data item at the base level of the particular hierarchical partition.

6. The method of claim 1, further comprising providing the hierarchical group in a user interface and enabling user inputs to modify the hierarchical group.

7. The method of claim 1, further comprising:
receiving an input selecting the set of data at the data store,
wherein the generating of the hierarchical group is in response to the receiving of the input selecting the set of data.

8. The method of claim 1, wherein the set of data comprises a table from a relational database, and wherein the two or more data items comprise two or more columns from the table.

9. The method of claim 1, wherein the library of ontological concepts comprises one or more hierarchical classifications of categories, and wherein classifying the two or more data items with respect to the library of ontological concepts comprises identifying one or more of the data items with one or more hierarchical levels in one of the hierarchical classifications of categories.

10. The method of claim 9, wherein the one or more hierarchical classifications of categories comprise one or more of a time category, a geography category, a product category, a business organization category, or an accounting category.

11. The method of claim 10, wherein the time category comprises a year hierarchical level, a quarter hierarchical level, and a month hierarchical level.

12. The method of claim 10, wherein the geography category comprises a country hierarchical level, a state/province hierarchical level, and a city hierarchical level.

13. The method of claim 10, wherein the product category comprises a department hierarchical level, a product line hierarchical level, and a product hierarchical level.

14. The method of claim 10, wherein the business organization category comprises a department hierarchical level, a manager hierarchical level, and an employee hierarchical level.

15. The method of claim 10, wherein the accounting category comprises a revenue hierarchical level and a profit hierarchical level.

16. The method of claim 9, wherein each of the one or more hierarchical classifications of categories comprises two or more hierarchical levels, and one or more of the hierarchical levels comprises one or more attributes.

17. A computer program product for generating a hierarchical group based on a set of data, the computer program product comprising a non-transitory computer-readable storage medium having program code embodied therewith, the program code executable by a computing device to:

classify two or more data items from a set of data with respect to a library of ontological concepts based at least in part on properties of the two or more data items, including detecting correlations between the properties of the two or more data items and one or more ontological concepts from the library of ontological concepts, wherein the properties of the two or more data items include data types defined for the two or more data items and ranges of data values in data fields of the two or more data items;

classify the two or more data items with respect to lexical correlations between the two or more data items, including determining correlations between one or more elements of headers of the two or more data items;

analyze the two or more data items based on one or more factors to determine whether the one or more factors contribute to defining a hierarchical relationship, wherein the analysis utilizes the one or more factors that comprise a set of heuristic rules and relative cardinality, wherein the set of heuristic rules discounts or disqualifies quantifiers or metrics associated with the two or more data items, and wherein the relative cardinality minimizes quantifiers or metrics through merging;

generate a hierarchical group in which the two or more data items are partitioned into one or more hierarchical partitions based at least in part on the classifying with respect to the library of ontological concepts, the classifying with respect to the lexical correlations, and the analysis of the two or more data items based on the one or more factors, wherein each of the one or more hierarchical partitions comprises the two or more data items; and verify a sampling of data in the one or more hierarchical partitions, including measuring correlations between data in the two or more data items in a particular hierarchical partition from the one or more hierarchical partitions to determine whether the particular hierarchical partition has a first data item at a leaf level of the particular hierarchical partition in a one-to-many relationship with a second data item at a base level of the particular hierarchical partition.

18. The computer program product of claim 17,
wherein the library of ontological concepts comprises one or more hierarchical classifications of categories,
wherein classifying the two or more data items with respect to the library of ontological concepts comprises identifying one or more of the data items with one or more hierarchical levels in one of the hierarchical classifications of categories, and
wherein the one or more hierarchical classifications of categories comprise one or more of a time category, a geography category, a product category, a business organization category, or an accounting category.

19. A computer system for generating a hierarchical group based on a set of data, the computer system comprising:
one or more processors, one or more computer-readable memories, and one or more computer-readable, tangible storage devices;
program instructions, stored on at least one of the one or more storage devices for execution by at least one of the one or more processors via at least one of the one or more memories, to classify two or more data items from a set of data with respect to a library of ontological concepts based at least in part on properties of the two or more data items, including determining correlations between the properties of the two or more data items and one or more ontological concepts from the library of ontological concepts, wherein the properties of the two or more data items include data types defined for the two or more data items and ranges of data values in data fields of the two or more data items;
program instructions, stored on at least one of the one or more storage devices for execution by at least one of the one or more processors via at least one of the one or more memories, to classify the two or more data items with respect to lexical correlations between the two or more data items;
program instructions, stored on at least one of the one or more storage devices for execution by at least one of the one or more processors via at least one of the one or more memories, to analyze the two or more data items based on one or more factors to determine whether the one or more factors contribute to defining a hierarchical relationship, wherein the analysis utilizes the one or more factors that comprise a set of heuristic rules and relative cardinality, wherein the set of heuristic rules discounts or disqualifies quantifiers or metrics associated with the two or more data items, and wherein the relative cardinality minimizes quantifiers or metrics through merging;
program instructions, stored on at least one of the one or more storage devices for execution by at least one of the one or more processors via at least one of the one or more memories, to generate a hierarchical group in which the two or more data items are partitioned into one or more hierarchical partitions based at least in part on the classifying with respect to the library of ontological concepts, the classifying with respect to the lexical correlations, and the analysis of the two or more data items based on the one or more factors, wherein each of the one or more hierarchical partitions comprises the two or more data items; and
program instructions, stored on at least one of the one or more storage devices for execution by at least one of the one or more processors via at least one of the one or more memories, to verify a sampling of data in the one or more hierarchical partitions, including measuring correlations between data in the two or more data items in a particular hierarchical partition from the one or more hierarchical partitions to determine whether the particular hierarchical partition has a first data item at a leaf level of the particular hierarchical partition in a one-to-many relationship with a second data item at a base level of the particular hierarchical partition.

20. The computer system of claim 19,
wherein the library of ontological concepts comprises one or more hierarchical classifications of categories,
wherein classifying the two or more data items with respect to the library of ontological concepts comprises identifying one or more of the data items with one or more hierarchical levels in one of the hierarchical classifications of categories, and
wherein the one or more hierarchical classifications of categories comprise one or more of a time category, a geography category, a product category, a business organization category, or an accounting category.

* * * * *